United States Patent [19]

Mercurio et al.

[11] 4,079,449
[45] Mar. 14, 1978

[54] DISPLAY APPARATUS FOR A BIPROGRAMMABLE ACCOUNTING COMPUTER WITH OPERATOR GUIDANCE

[75] Inventors: Luigi Mercurio, Ivrea (Turin); Piercarlo Ravasto, Calolziocorte (Bergamo), both of Italy

[73] Assignee: Ing. C. Olivetti & C., S.p.A., Ivrea (Turin), Italy

[21] Appl. No.: 612,470

[22] Filed: Sep. 11, 1975

[30] Foreign Application Priority Data

Sep. 18, 1974 Italy .................. 69811 A/74

[51] Int. Cl.² .......................... G06F 3/14; G06F 9/18; G06F 15/02; G06F 15/22
[52] U.S. Cl. .................................................. 364/200
[58] Field of Search ............... 340/172.5; 445/1; 364/200, 900

[56] References Cited

U.S. PATENT DOCUMENTS

| | | | |
|---|---|---|---|
| 3,533,076 | 10/1970 | Perkins et al. | 340/172.5 |
| 3,541,526 | 11/1970 | Levy et al. | 340/172.5 |
| 3,573,749 | 4/1971 | Smith et al. | 340/172.5 |
| 3,596,254 | 7/1971 | Highleyman et al. | 340/172.5 |
| 3,596,256 | 7/1971 | Alpert et al. | 340/172.5 |
| 3,631,403 | 12/1971 | Asbo et al. | 340/172.5 |
| 3,686,637 | 8/1972 | Zachar et al. | 340/172.5 |
| 3,906,457 | 9/1975 | Mattedi et al. | 340/172.5 |
| 3,946,220 | 3/1976 | Brobeck et al. | 340/172.5 X |
| 3,976,975 | 8/1976 | Cochran | 340/172.5 |

*Primary Examiner*—Melvin B. Chapnick
*Attorney, Agent, or Firm*—Schuyler, Birch, Swindler, McKie & Beckett

[57] ABSTRACT

A visual display for an electronic accounting computer comprising a keyboard and a console. The computer concurrently executes two programs. The console is provided with a changeover switch for selectively allocating the keyboard, the display and the console to one of the programs. As introduction from the keyboard is required, an operator guidance message is displayed. This message is replaced by the response of the operator when it is initiated. If the program not selected by the allocating switch requires attention, an operator call message is developed. The changeover switch is moved to select the program requiring attention. An appropriate message requesting the needed data is displayed, to be replaced by the data as the operator introduces it. The operator then repositions the allocating switch, and the message defining the next required introduction of the original program is displayed, so that data introduction may resume.

9 Claims, 37 Drawing Figures

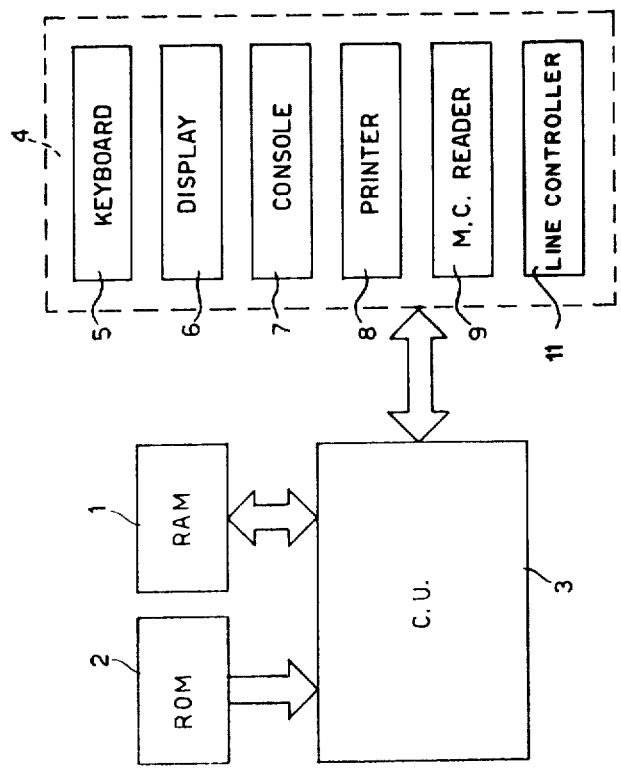

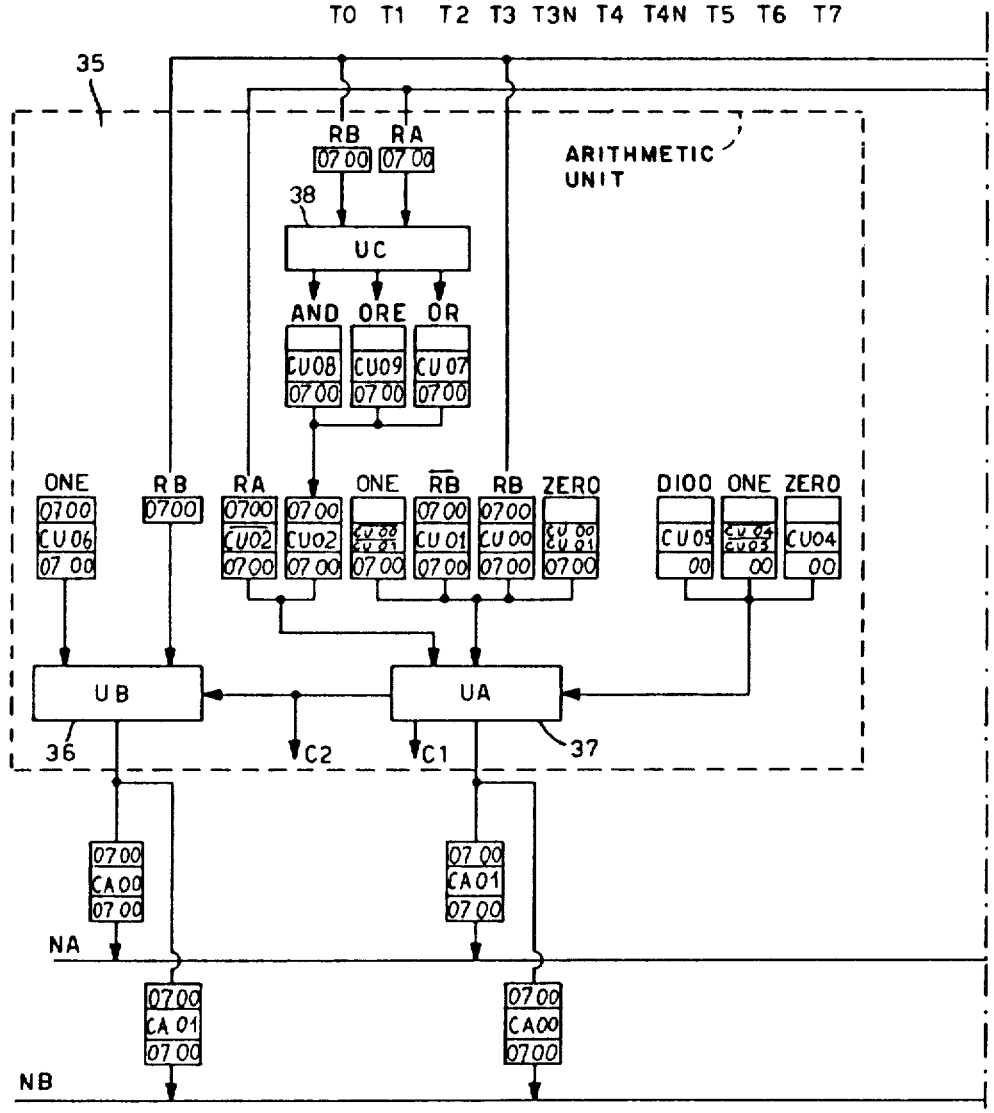

RAM1-ZRM

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 000 | | | | | | | | | | | | | | | | |
| 1 | | | | | | | | | | | | | | | | |
| 2 | | | | | | | | | | | | | | | | |
| 3 | | | | | | | | | | | | | | | | |
| 4 | | | | | | | | | | | | | | | | |
| 5 | | | | | | | | | | | | | | | | |
| 6 | | | | | | | | | | | | | | | | |
| 7 | | | | | | | | | | | | | | | | |
| 8 | | CL-400 | | | | | | | | | | | | | | |
| 9 | | | | | SERVICE | | AREA | | | | | | 352 | | | |
| A | | | | | | | | | | | | | | | | |
| B (300→) | | RB-310 | P1-311 | | | P2-312 | CP-313 | P1-314 | MI-315 | 316 | 317 | 318 | CP-333 | AI-334 | II-335 | |
| C | | | | | ITR-353 | | | BSD-351 | | | | | | | | |
| D (301→) | | RB-320 | P1-325 | | | P2-322 | CP-323 | CI-324 | MI-325 | 326 | IR-327 | | | | BS-410 | BP-441 |
| E | AS-520 | | | | AB-370 | | P1-450 | | | P2-451 | | | | IS-350 | | BI-422 |
| F | | | | | | | | | | | | | | | | |

FIG. 9a

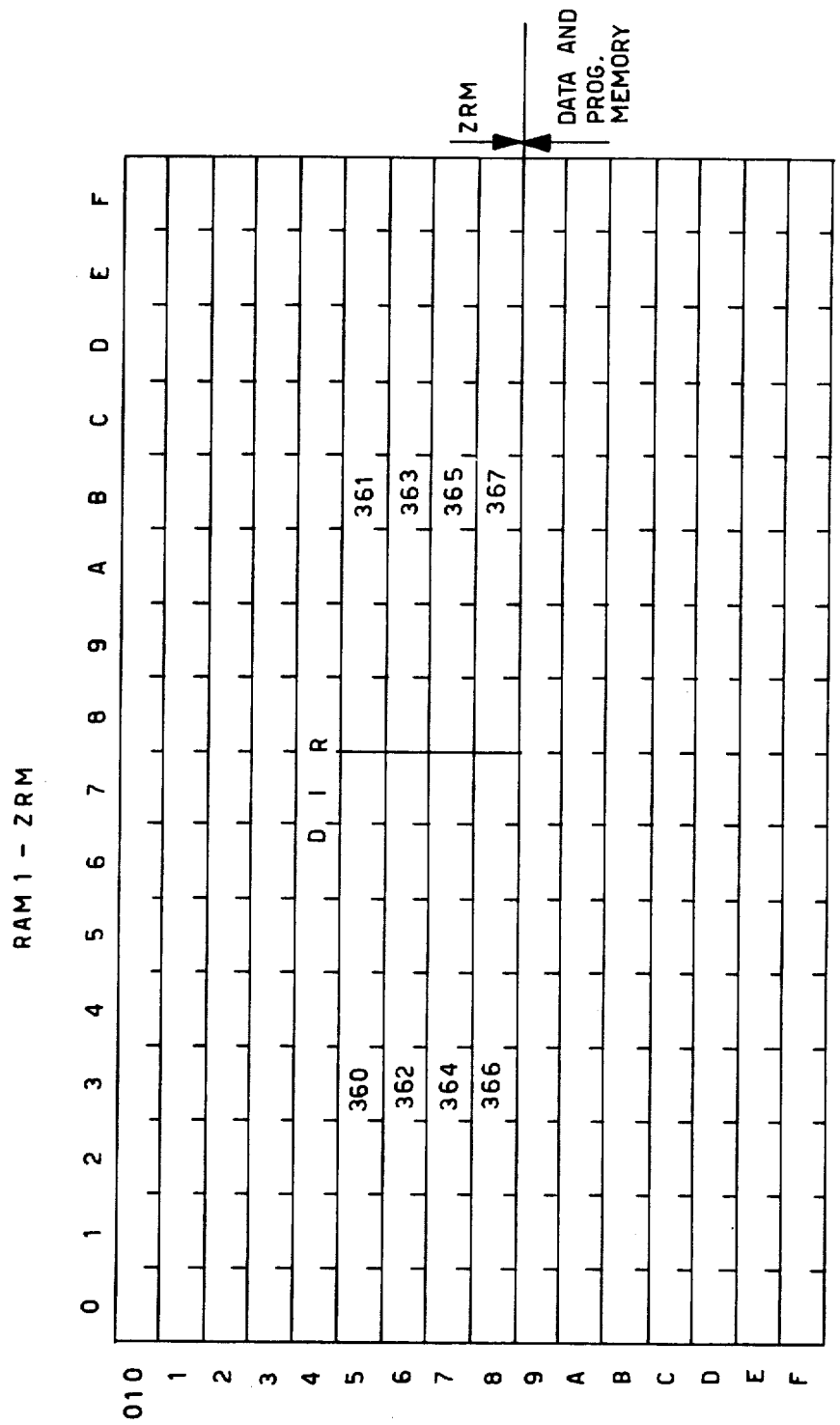

PROGRAM CONDITIONS BYTE (CP)

```
07 06 05 04 03 02 01 00
| X | X | 1 | X | 1 | X |   |   |
```

- CONDITION CODE (bits 00, 01)
- PROGR. X/Y (bit 02)
- 1=RAM1  0=ROM2 (bit 03)
- ENABLE BIPROGR. (bit 04)
- ENABLE DBG (bit 05)
- NOT USED (bit 06)
- NOT USED (bit 07)

FIG. 9c

INTERRUPT CODE BYTE (CI)

```
07 06 05 04 03 02 01 00
| 1 | 1 | 1 | X | X | 1 | 1 | X |
```

- CLASS 1
- " 2
- " 3
- " 4
- " 5

FIG. 9d

ENABLE INTERRUPT BYTE (AI)

```
07 06 05 04 03 02 01 00
| 1 | 1 | 1 | X | X | 1 | 1 | X |
```

- CLASS 1 IN RAM 1
- " 2 "
- " 3 "
- " 4 "
- " 5 "

FIG. 9e

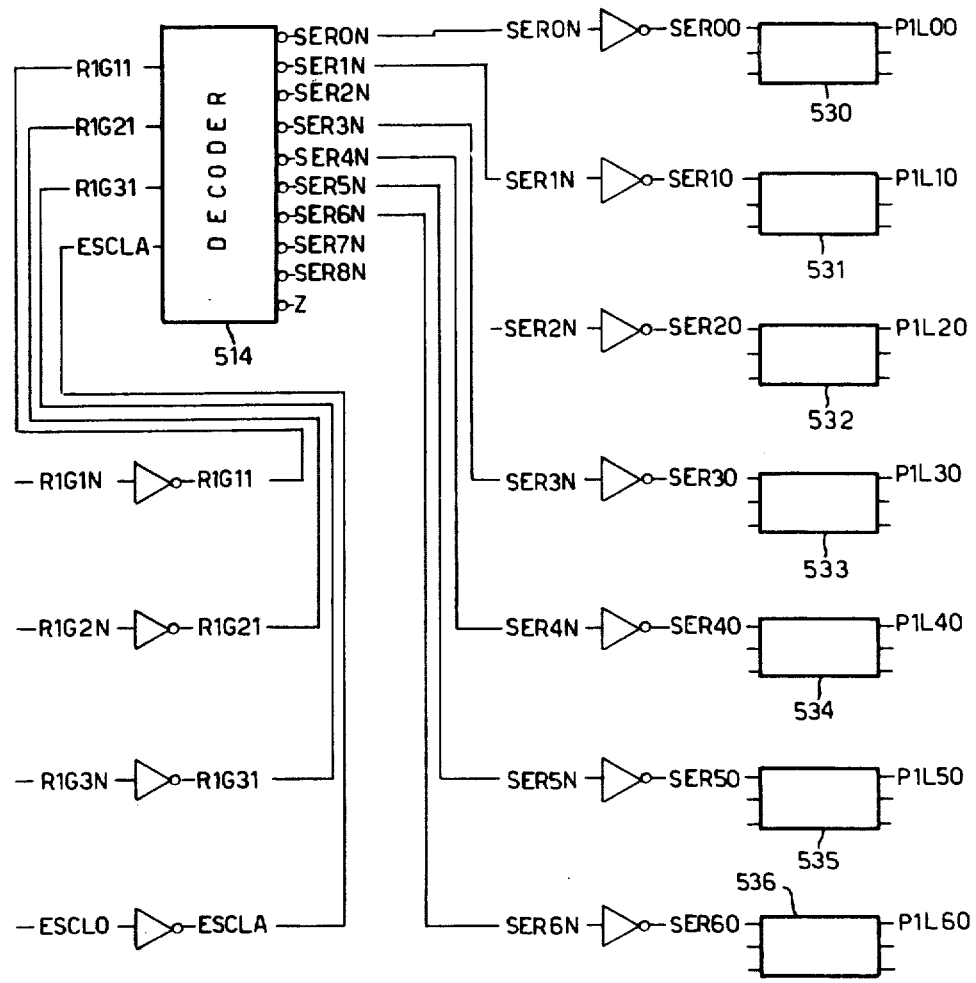
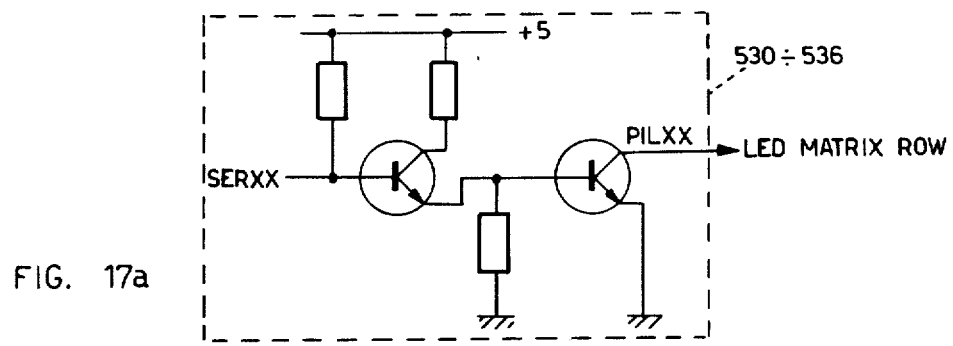
FIG. 17a

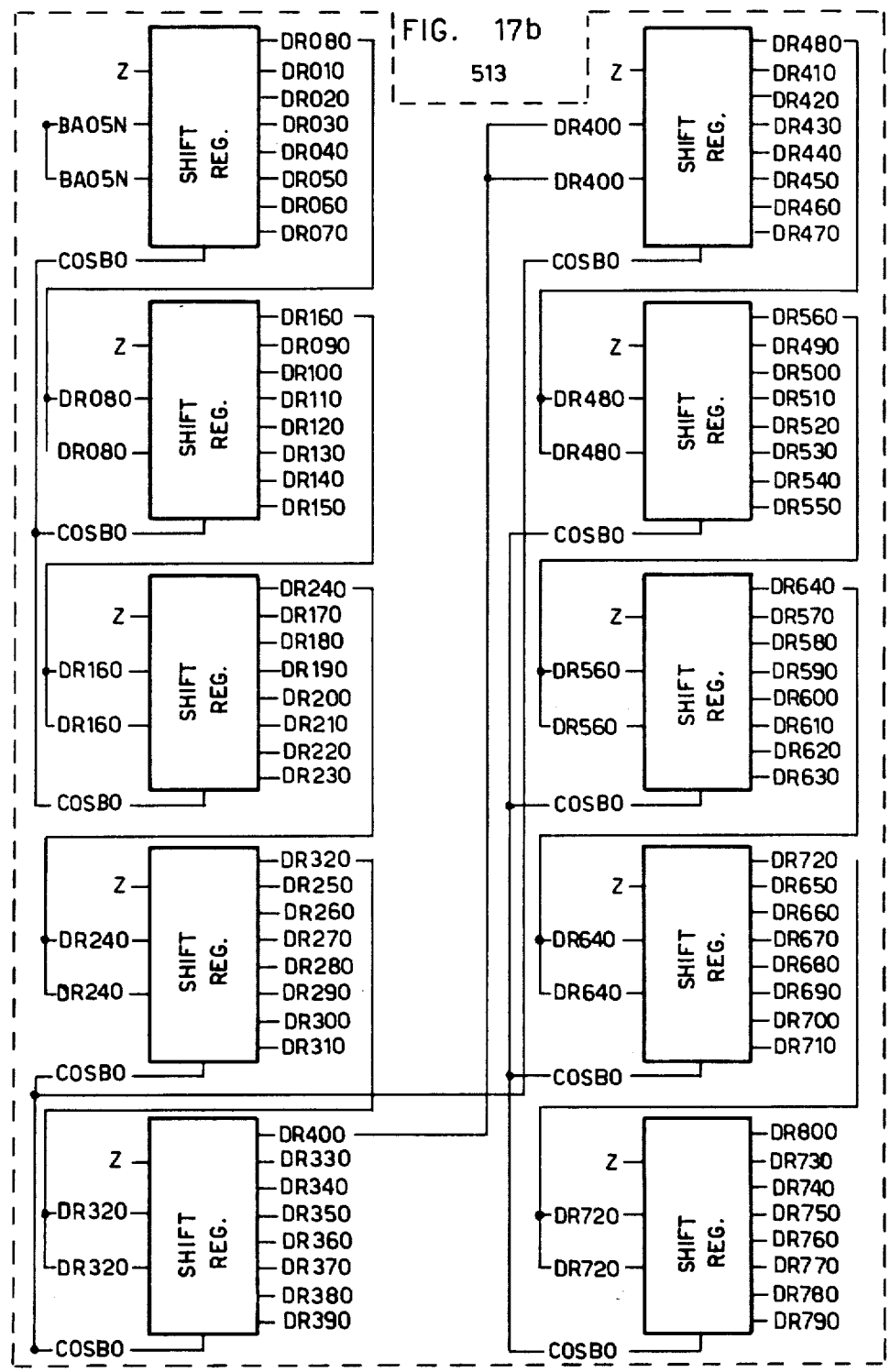

TIMING OF LIGHTING UP

FIG. 21C₁
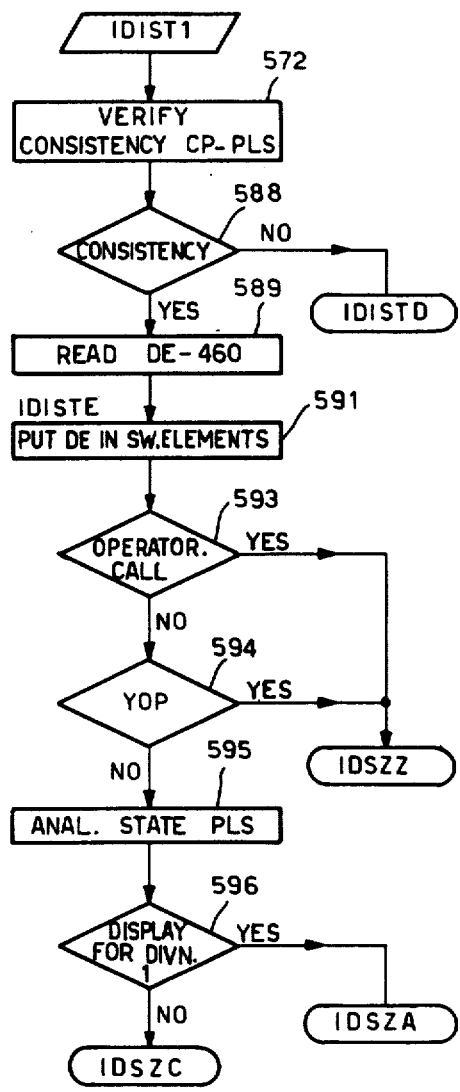
FIG. 21C₃
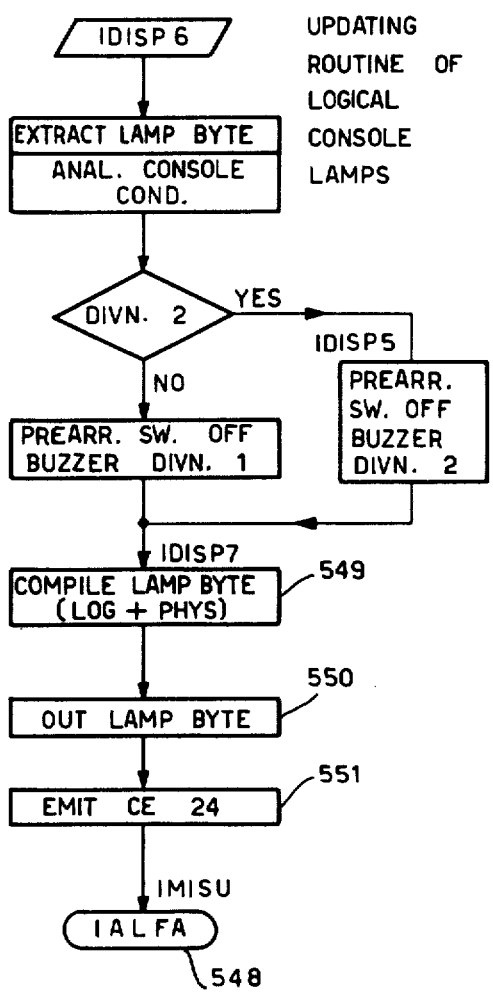
UPDATING ROUTINE OF LOGICAL CONSOLE LAMPS
FIG. 21C₂
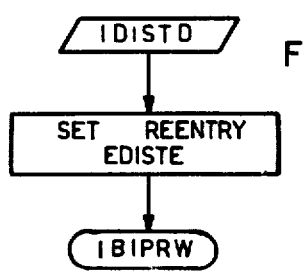

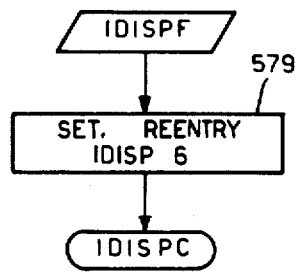
FIG. 21d₁
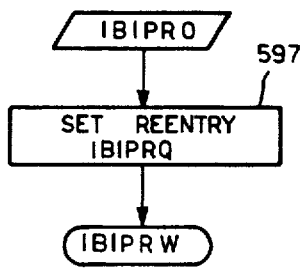
FIG. 21d₂
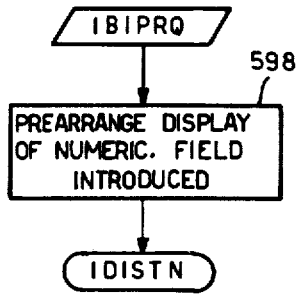
FIG. 21d₃
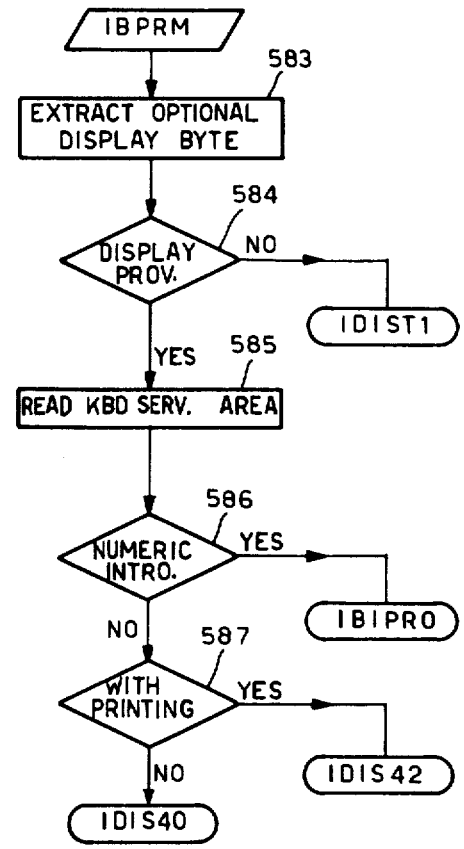
FIG. 21d₄

DISPLAY APPARATUS FOR A BIPROGRAMMABLE ACCOUNTING COMPUTER WITH OPERATOR GUIDANCE

BACKGROUND OF THE INVENTION

The invention relates to a special type of display which can be used in those biprogrammed computers in computers capable of having two programs in progress at the same time (also named "biprogrammed computers") in which provision is made for a frequent conversation between the operator and the computer itself (e.g., computers oriented for accounting purposes).

A biprogrammable electronic computer is known in which in the course of each program, a pair of displays each associated with a corresponding program signals the operator with requests for intervention which relate to the relevant program. Moreover, this computer is furnished with a third display for visually displaying the characters introduced by means of the keyboard. Finally, a fourth display is necessary if the computer is oriented for accounting purposes, because programs are typically used which continually require the intervention of the operator for data introduction. Such a request for data is generally accompanied by information on the type of the data; for this purpose, the fourth display is required.

The major disadvantage of this system is that the operator is obliged to converse with a plurality of elements at the same time.

Another disadvantage of this system is due to the error signalling displays as now known in the art. These displays visually display the cause of the request for intervention coded in only two characters; the operator is therefore obliged each time to consult a manual in order to known the operation to be carried out to be able to remove this cause.

Finally, the considerable financial burden arising from the use of so many displays is evident, due to the handling hardware which is required by them.

SUMMARY OF THE INVENTION

These disadvantages are obviated by the display according to the invention which, as will be better explained hereinafter, performs simultaneously and selectively the functions carried out by the four displays which have been mentioned.

According to the present invention there is provided visual display for an electronic accounting machine having a keyboard for introducing information into the machine, a service console for signalling abnormalities and introducing commands into the machine, a memory for recording data and instructions, a processing unit for executing the instructions, an addressing register included in the processing unit for recording the initial address of the field of the memory to be visually displayed, a control unit for the visual display controlled by the processing unit for supplying the data to be displayed to the visual display, means for identifying a plurality of fields of the memory to be visually displayed, and means for recording a plurality of conditions associated with the keyboard, with the console and with the processing unit and for conditioning the processing unit to transfer selectively to the addressing register from the identifying means the address of a field of the plurality of fields to be visually displayed which is associated with said conditions.

More particularly, in the preferred embodiment, the display visually displays the contents of a field of memory from among various possible fields, the choice of this field being made automatically as a function of the current instruction and of the position of a change-over switch PLS (program selection). The change-over switch PLS allocates the display, the console and the keyboard to one of the two programs (X,Y) which can be carried out in biprogramming by the computer.

The fields visually displayed may be:

1A - Field or register defined by a visual display instruction (DYM or DYR) relating to program X.

1B - Field defined by an "operator call" instruction (OPC) or by an "introduce and visually display for debugging" instruction (YOP) relating to program X.

2A - As 1A, but relating to program Y.

2B - As 1B, but relating to program Y.

3 - Data introduced from the keyboard during an instruction.

This advantage is particularly useful in the case of electronic accounting machines in which the two programs being executed generally handle completely different tasks. For example, program X carries out invoicing or accounting work and therefore requires continuous intervention by the operator, while program Y typically carries out file or record updating work by reading the data directly from an external record member, or the work of sending data to line, which therefore does not require frequent intervention by the operator.

It may happen, however, that program Y requires the intervention of the operator for various reasons, such as an error in the data, a reading error or the end of the program. The request for intervention by the operator is signalled by the lighting up of a special lamp on the console and by the activation of an acoustic signalling device. In these cases, the operator actuates the change-over switch PLS, allocating the display, the console and the keyboard to program Y which has requested the intervention. On the display appears the cause of the interruption and the operator, using the keyboard, introduces data and commands adapted to remove the cause of the interruption.

While the keyboard is operated the display visually displays the characters introduced until a special key which signals the end of the introduction is actuated.

At the end of the introduction of data from the keyboard, the display visually displays the message relating to the program being executed or to that which has interrupted. Finally, when the cause of interruption in program Y has been removed, the operator repositions the change-over switch PLS at program X and resumes the interrupted work.

It should be noted that much of the machine described below is described in our copending U.S. application Ser. No. 523,493 and U.S. Application Ser. No. 648,587 (notice of allowance received) which is a continuation of the application Ser. No. 609,803 (which are, however, respectively concerned with debugging the programs and the way in which the change-over switch PLS allocates the keyboard, display and console selectively to the two programs).

For greater clarity, the operation of the display will be summarized.

A - The change-over switch PLS allocates the display, keyboard and console to one of the two programs being executed (for example, to program X).

B - The display normally displays the messages indicated by the instructions (DYM and DYR) relating to the allocated program (X in the example given). These messages indicate to the operator the type and the amount of data required by the program.

C - During the introduction of the data, the display visually displays the same until the introduction itself is correctly terminated.

D - If there are no interruptions, the display resumes alternate visual display in accordance with what has been said in paragraphs B and C.

E - There is an interrupt request by program Y (to which the display is not allocated) by means of an acoustic signal and the lighting up of an operator call lamp (PLA). When the operator considers it suitable (for example, after terminating the introduction in progress), he positions the change-over switch PLS at program Y. At this point, the cause which has interrupted program Y appears on the display, for example, end of the program, or end of the paper for the printer, etc.

F - The operator activates the commands required to remove the cause of the interruption, then repositions the change-over switch PLS at program X and resumes the interrupted work.

BRIEF DESCRIPTION OF THE DRAWINGS

The invention will be described in more detail, by way of example, with reference to the accompanying drawings, wherein:

FIG. 1a is a block diagram of an accounting machine embodying the invention;

FIG. 8 is a plan of the registers 30;

FIGS. 9a and 9b show the reserved zone (ZRM) of the RAM 1;

FIGS. 9c to 9e represent a number of significant bytes;

FIGS. 17a and 17b comprise a detailed diagram of the line buffer 513 and light driving circuits 514 and 515;

FIGS. 21a to 21d are a flow diagram of the display handling microprogram;

LIST OF ABBREVIATIONS

DI = Register 40, indicates the eight switching elements
DEv = a switching element of the register 40, specified by three bits
CRT = Character, corresponds to eight memory bits
MEM = Memory RAM 1
IND = Address
MLS = Sequence logic matrix 28
RB = Base register
P1 = Pointer 1
P2 = Pointer 2
CP = Program conditions
CI = Interrupt code
MI = Instruction modification
EXOR = Exclusive-OR
CI = Interrupt code
IP = Program addresser (L07)
AI = Enable interrupt
PSR = Program in progress (Register 300 of RAM 1)
IPSR = Interrupt program (Register 302 of RAM 1)
OPSR = Interrupt program (Register 301 of RAM 1)
ZRM = Reserved zone of RAM 1
RC = Current reference
CC = Condition code
CU = Central unit 3
PU = Peripheral unit 4
IR = Reentry address (Register 327, FIG. 9)
RL = Working register (Register 352 of FIG. 9)
AB = Enable bars
ITR = Reference Table address register.

DESCRIPTION OF PREFERRED EMBODIMENT

A brief description of the electronic accounting machine using the system according to the invention will now be given with reference to FIGS. 1a and 1b.

Figure 1B:
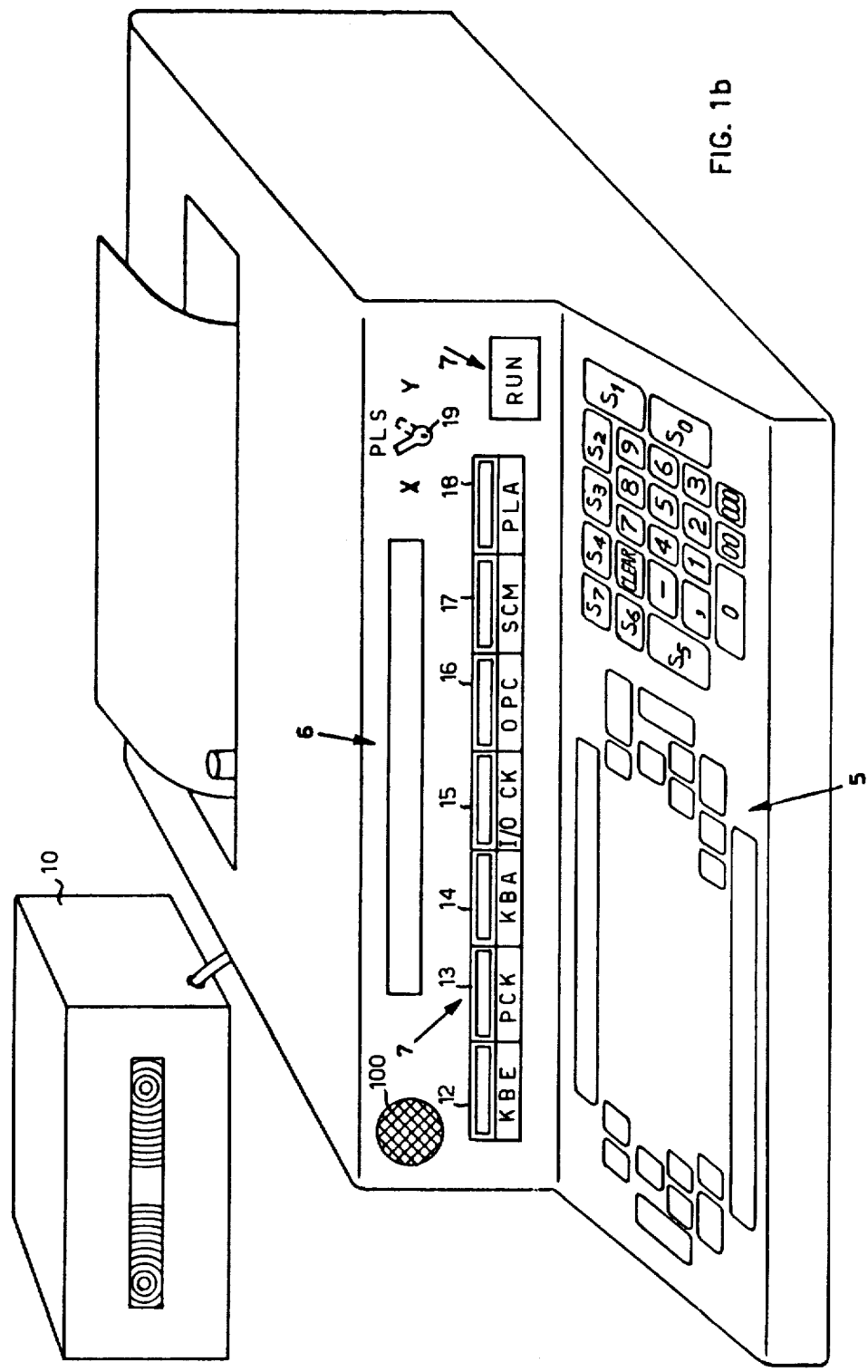
FIG. 1b is a view of the accounting machine according to the invention.

More particularly, the accounting machine of FIGS. 1a and 1b is of the microprogrammed type, that is to each instruction of the program there corresponds a microprogram recorded in a permanent memory, so that the execution of a program instruction is achieved by means of the sequential execution of the microinstructions of the respective microprogram.

The accounting machine of FIGS. 1a and 1b comprises a memory RAM 1 adapted to contain the instruction and the data of the program in process of execution, and a memory ROM 2 adapted to contain the microprograms which implement the instructions of the programs.

The memories RAM 1 and ROM 2 may be of any known type on the market and will therefore not be described in detail; it is only made clear that each cell of both of the memories is adapted to contain sixteen bits.

The memories RAM 1 and ROM 2 are connected to a central processing unit 3, which will be described in detail hereinafter and which is connected in turn to a group of peripheral units 4.

The peripheral units 4 may be of various kinds according to the particular application for which the accounting machine is intended. More particularly, the peripheral units shown are an alphanumeric keyboard 5, a visual display 6, a control console 7, a printer 8, a read/write unit 9 adapted to record and read data on a magnetic card, a magnetic tape reader 10, and a line controller 11 adapted to control the exchange of data between the accounting machine and a remote processor.

The console 7 comprises a series of seven lamps 12 to 8 and an acoustic signalling device 100 which signal to the operator particular conditions associated with the program being executed. More particularly, the lamp 12 (KBE) indicates an error in introduction from the keyboard; the lamp 13 (PCK) indicates an abnormality in the working-out of the program; the lamp 14 (KBA) indicates that the keyboard buffer is almost full; the lamp 15 (I/O CK) indicates that there is an error on the input/output channel; the lamp 16 (OPC) indicates that the program requires the intervention of the operator; the lamp 17 (SCM) indicates that a service message for the operator is present on the display 6; and, the lamp 18 (PLA) indicates that the program not selected by the change-over switch 19 has a message for the operator. Finally, the change-over switch 19 (PLS) allocates the keyboard 5, the display 6 and the lamps 15, 16 and 17 to program X or program Y.

CENTRAL UNIT (FIG. 2)

A detailed description of the central unit 3 will now be given with reference to FIG. 2.

The central unit 3 is an assembly of logic circuits which handle and execute the various microprograms contained in the ROM 2.

It is composed of four main blocks:

A timer 20 which times the development of the processing of the data inside the central unit 3. This timer is composed of an oscillator 21 and an assembly of signal generating circuits 22.

A sequence logic matrix network 25, which staticizes and interprets the codes of the microinstructions read from the ROM 2 and generates the commands necessary for the execution thereof. This network is composed of a microinstruction register (R0) 26, a state register (S0) 27 and a sequence logic matrix (MLS) 28.

An operative network which carries out the processing of the data by methods imposed by the sequence logic matrix 28. The operative network comprises: the operative registers 30 (scratch pad) which are divided into two groups RA-31 and RB-32 each of which is composed of sixteen eight-bit registers hereinafter referred to as A0-A15 and B0-B15, respectively; an arithmetic unit 35 which comprises three blocks UA-37, UB-36, UC-38 with eight-bit parallelism; the switching elements DI-40; a shift nework ND-41; an input network to the operative registers which comprises the nodes NA and NB and two registers BA-42, BB-43; and, a network providing connection with the RAM 1 and composed of nodes N0 and NC; a channel logic 45 which controls the interface providing connection of the peripheral units and monitors the operative simultaneity of the central unit 3.

A detailed description of the above-enumerated blocks will now be given.

1. TIMER (20) (1) (2) microinstruction

The oscillator 21 generates periodic pulses which define a fixed period of time called the machine cycle which lasts for the time necessary for the execution of an elementary operation (for example: reading of an operative register 30, its incrementing and rewriting in the operative register 30).

During the machine cycle, signals are generated by the circuit 22, the duration of which and the positioning of which in the machine cycle are fixed.

The function of these signals is predetermined and the fact that they act or do not act on the circuits of the central unit 3 is determined by the conditions generated by the sequence matrix 28 in the manner to be described hereinafter.

The working of the central unit 3 is completely synchronous with this timing, as is also the conversation with the peripheral units.

Ten signals are generated by the circuit 22 and their use is illustrated hereinafter. The signals are:

T0 which acts on the state register 27;
T1 which times the reading of the ROM 2;
T2 which times the RAM 1;
T3A which acts on the register R0-26;
T3N which also acts on the register R0-26;
T4A which acts on the registers BA42, BB43 and on the switching elements 40;
T4N which acts on the register BA42, BB43 and on the switching elements 40;
T5 which acts on the operative register 31 and 32; and,
T6 and T7 which act on the channel logic 45.

Figure 3:
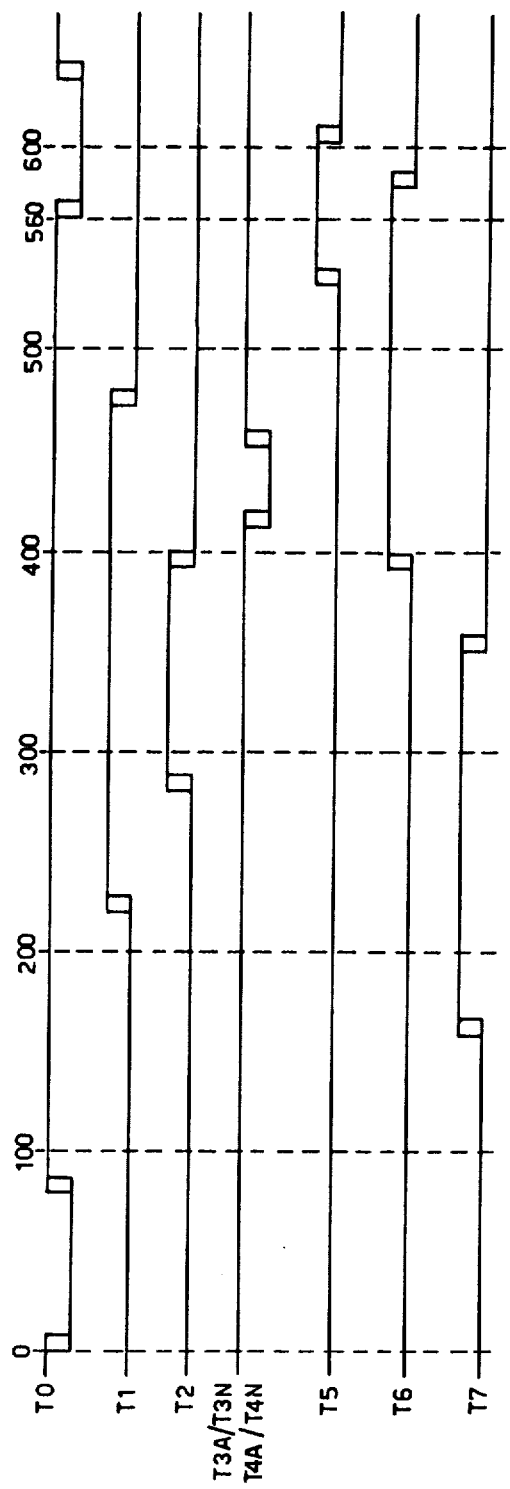
FIG. 3 shows the timing signals of the central unit.

FIG. 3 is a timing diagram in which the signals mentioned appear.

Of course, the oscillator 21 and the circuits 22 are not described in detail, since they are known in the field of circuit design.

2. EXECUTION OF MICROINSTRUCTIONS

Before proceeding to the description of the other blocks of the central unit 3, a brief mention will now be made of the microinstructions used by the central unit 3 in the system according to the invention and of the execution thereof.

The execution of a microinstruction can be divided into two phases: (1) An interpretive phase, common to all the microinstructions, which reads the addressed microinstruction from the ROM 2, prearranges the carrying out thereof and increments the addresser of the ROM 2. This phase is obviously independent of the code of the microinstruction read. (2) An execute phase, during which the processing of the data takes place in accordance with the procedures indicated by the microinstruction read in the preceding interpretive phase. The interpretive phase is always performed in a single machine cycle and the configuration of the signals (hereinafter called "commands") is stable within the limits of the cycle. The configuration of these commands defines the operations to be performed and is called the "Interpretive State".

Figure 4:
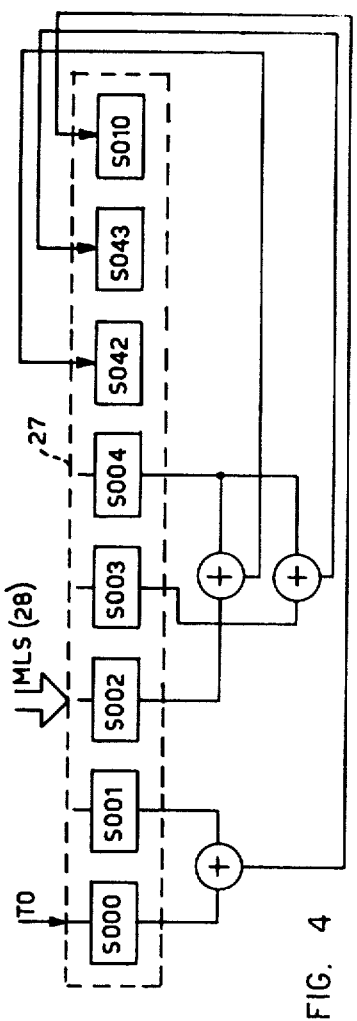
FIG. 4 shows the state register S0.

The presence of the interpretive state is identified by a flip-flop S000 of the register 27 (FIG. 4).

The execute phase is performed in one or more machine cycles to which there correspond as many states, each defined by a corresponding flip-flop of the register 27.

Throughout the execute phase, the code of the microinstruction in question remains stable in the register 26, while the situation of the flip-flops of the register 27 which define the current state develops.

Each state defines the next as a function of the code of the microinstruction read.

At the end of the execution of each microinstruction a return is made to the interpretive state S000 to read the following microinstruction from the ROM 2.

During the two phases, the interpretive phase and the execute phase, the combinatory network 28 (MLS), which has the registers 26 and 27 as inputs, generates commands C which enable given flows of information through the operative network or the other blocks of the central unit 3.

The information then flows between the blocks of the central unit 3 through a series of AND gates of various types which are controlled by the commands C generated by the combinatory network 28. In FIG. 2 these gates are symbolically represented as divided into three zones. The central zone contains the control signal of the gate generated by the network 28 (MLS). When this command is present, the signals at the input of the gate are transferred to the following block. The pairs of numbers varying from 00 to 15 which are in the top zone and the bottom zone of the gates indicate the number of bits which they allow to pass and more precisely the positions in which these bits are at the input and the output. For example, a gate having the pairs of numbers 07, 00 both at the input and output is a gate which transfers an eight-bit character in direct parallel. On the other hand, a gate having the pair of numbers 03, 00 in the top zone, that is at the input, and the pair of numbers 07, 04 in the bottom zone, that is at the output, is a gate which transfers four bits shifting them to the left by four places. If 07, 04 are input and 03, 00 are output, the shifting is by four places to the right. Finally, if the input zone is empty, this signifies that the bits are forced into the gate from outside.

There is described hereinafter, with reference to Table A, the set of microinstructions used by the display system according to the invention, omitting the other microinstructions which the central unit is capable of executing. The microinstructions given in Table A have a fixed format of sixteen bits which corresponds to one word of the ROM 2. The format of the microinstructions is as follows:

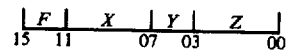

The fields, each of four bits, have the following significance:

F is the operative code of the microinstruction;
X indicates the first operand;
Y indicates the second operand;
Z is an extender of one of the foregoing fields.

When the fields X and Y specify as operands the registers A, B or L of the operative registers 30, they will be indicated in the microinstructions by the symbols Ax, Bx, Lx, Ay, By, Ly, respectively.

The microinstructions are divided into groups distinguishable by the function codes, that is by the different binary configuration of the field F of the microinstruction.

The microinstructions having the same function code are executed according to the same sequence of states.

TABLE A

| Name | F | X | Y | Z | FUNCTION |
|------|---|---|---|---|----------|
| | | | | | LOGICAL ARITHMETIC |
| ADDB | 0110 | A | B | 0101 | B←(A+B) |
| ANDA | 0110 | A | B | 1000 | if (A←A AND B) = 0 |
| ANDB | 0110 | A | B | 0100 | if (B←A AND B) = 0 |
| AND | 0110 | A | B | 0000 | if (A AND B) = 0 |
| ORA | 0110 | A | B | 1110 | if (A←A OR B) = 0 |
| ORE | 0110 | A | B | 0111 | if (A EX OR B) = 0 |
| SOT | 0110 | B | B | 0010 | if (A − B) > 0  DOO = 1 |
| | | | | | TRANSFER |
| TAB | 0101 | A | B | 1100 | B ← A |
| TBA | 0101 | A | B | 0011 | A ← B |
| | | | | | EXCHANGE |
| SLL | 0100 | L | L | 1111 | Ax ⇄ By ; Bx ⇄ Ay |
| | | | | | DECREMENT |
| DCA | 1010 | A | 0100 | 1010 | if (A←A − 1) = 0 puts DO1 = 1 |
| | | | | | LOAD SWITCHING ELEMENTS |
| TADI | 1011 | A | 1110 | 0111 | DI←A |
| TBDI | 1011 | B | 1111 | 0111 | DI←B |
| REDI | 1011 | 0 DEV | 0110 | 0110 | DEV ←'0' |
| SEDI | 1011 | 1 DEV | 0110 | 0110 | DEV ←'1' |
| SHSB | 1011 | B | 0001 | 0101 | SHIFT B one bit to left |
| ROTB | 1011 | B | 0001 | 0110 | Exchange semibyte |
| AZAP | 1011 | A | 0010 | 0111 | Zeroize left semibyte |
| | | | | | JUMP |
| SAI | 000 | | I | | Unconditional jump IND. I |
| SADO | 0010 | 0 DEV | I | | Jump to I if DEV = 0 |
| SADI | 0011 | 0 DEV | I | | Jump to I if DEV = 1 |
| | | | | | WRITE/READ RAM 1 |
| MAD | 1100 | A | | | A←MEM. IND. I |
| AMD | 1101 | A | | | MEM. IND. I←A |
| AMI | 1110 | L | A | 1011 | MEM. IND. L←A |
| BMI | 1110 | L | B | 0011 | MEM. IND. L←B |
| AMIP | 1110 | L | A | 1001 | MEM. IND. L←A; L←L + 1 |
| BMIP | 1110 | L | B | 0001 | MEM. IND. L←B; L←L + 1 |
| MAIP | 1110 | L | A | 1101 | A←MEM. IND. L; L←L + 1 |
| MBIP | 1110 | L | B | 0101 | B←MEM. IND. L; L←L + 1 |
| | | | | | FORCE REGISTERS 30 |
| CRTA | 1000 | A | CRT | | A ← CRT |
| CRTB | 1001 | B | CRT | | B ← CRT |
| | | | | | READ ROM 2 |
| ROMA | 0111 | A | 0000 | 0000 | A←MEM. IND. L2; if b07 = 0, put 8 least significant bits, if b07 = 1, put 8 most significant bits b07 = most significant bit of the register B2. L2←L2 + 1 |

TABLE A-continued

| Name | F | X | Y | Z | FUNCTION |
|------|---|---|---|---|----------|
| TCCA | 1010 | A | 1000 | 1000 | A←CRT FROM CONSOLE |

3. REGISTER S0 (27)

The register 27 is formed by eight flip-flops (FIG. 4) which differentiates the various machine cycles. They are: S000-S001-S002-S003-S004-S042-S043-S010.

Their positioning is controlled by the logic matrix 28 by direct analysis of the field F of the microinstruction present in the register 26 (RO). The changing of the configuration of the register 27 takes place with the leading edge of the signal T0 and this is the first operation which the matrix 28 effects within the limits of a timing cycle.

The signals S042, S043, S010 are obtained from the OR function of the following states:

$$S042 = S004 + S002$$
$$S043 = S004 + S003$$
$$S010 = S000 + S001$$

Figure 5:
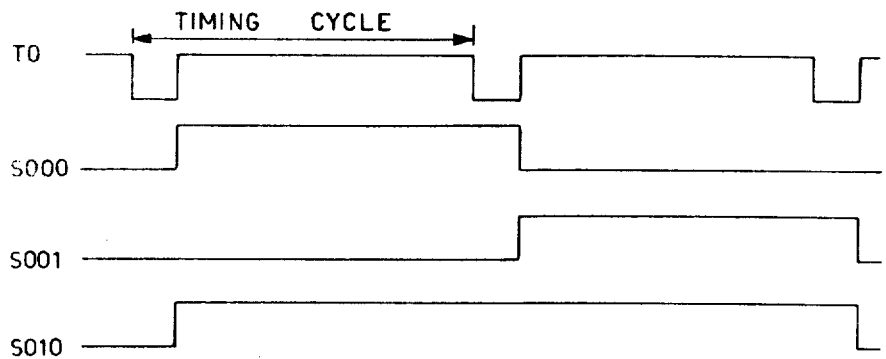
FIG. 5 shows the timing of the register S0.

FIG. 5 shows the timing diagram relating to the state S010 starting from the states S000 and S001. Of course, the states S042 and S043 will be generated in similar manner. It is to be noted, therefore, that the matrix 28 generates only five states, that is to say S000 to S004, while the other three states are derived therefrom.

The sequence of the states corresponding to the microinstructions of TABLE A is now given in TABLE B.

TABLE B

| F | SEQUENCE OF EXECUTION | TYPE OF MICROINSTRUCTION |
|---|----------------------|--------------------------|
| 000 | S001 | |
| 0010 | S001 | JUMP |
| 0011 | S001 | |
| 0100 | S002 S003 | |
| 0101 | S002 | TRANSFER |
| 0110 | S002 | ARITHMETICAL AND LOGICAL |
| 0111 | S002 S001 S004 | |
| 1000 | S004 | READING |
| 1001 | S004 | ROM 2 INTO RA/RB VARIOUS |
| 1010 | S004 | ± CHECK;/CONSOLE |
| 1011 | S004 | SHIFT AND OPER. ON SWITCHING ELEMENTS 40 |
| 1100 | S004 S002 | |
| 1101 | S004 S002 | |
| 1110 | S004 S002 | MEMORY RAM 1 |
| 1110 | S004 S003 | |
| 1111 | S004 S003 | |

It is to be noted, finally, that all the sequences are preceded by the interpretive state S000. The commands generated by the matrix 28 in the individual states will be described in the continuation of the description.

4. MICROINSTRUCTION REGISTER 26 (R0)

The register 26 comprises sixteen flip-flops which staticize the code of the microinstruction or the information read from the ROM at the address specified by predetermined operative registers 30.

The sixteen flip-flops are divided into two groups of eight; those which are least significant are commanded by the signal T3N, the others by the signal T3A.

The generation of the signals T3N and T3A takes place only in the two states in which reading of the ROM is performed, that is in the interpretive state S000 of all the microinstructions and in the state S001 of the microinstruction ROMA.

With the leading edge of the signals T3N and T3A, the sixteen bits read from the ROM 2 are staticized in the register R0-26 and constitute the code of the microinstruction which must be executed.

Figure 6:
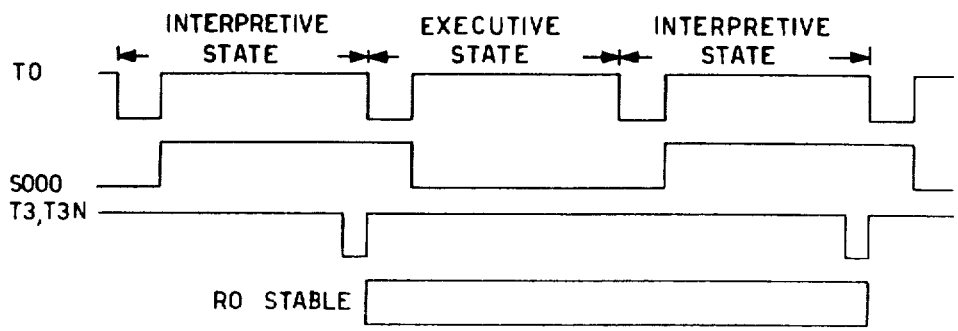
FIG. 6 shows signals operating on the register S0.

The information remains stable in the register during all the following execute states, as shown in FIG. 6.

As has been said, in the state S001 of the microinstruction ROMA a second reading of the ROM takes place. The eight least significant flip-flops of the register 26 are positioned with the signal T3N by the eight most or least significant bits read. This depends on the value of the bit 07 of the register B2 (see Table A).

5. THE OPERATIVE REGISTERS 30 (SCRATCH PAD)

The operative registers 30 are arranged in two series, referred to as A and B, of sixteen registers each having a capacity of eight bits (FIG. 8). The bits of the same weight of the registers of each of the two series, for example the series A, are arranged in a 4 × 4 matrix (FIG. 7), so that there are eight 4 × 4 matrices in which the first bits of each thereof form the register A0, the second bits the register A1, and so on.

Figure 7:
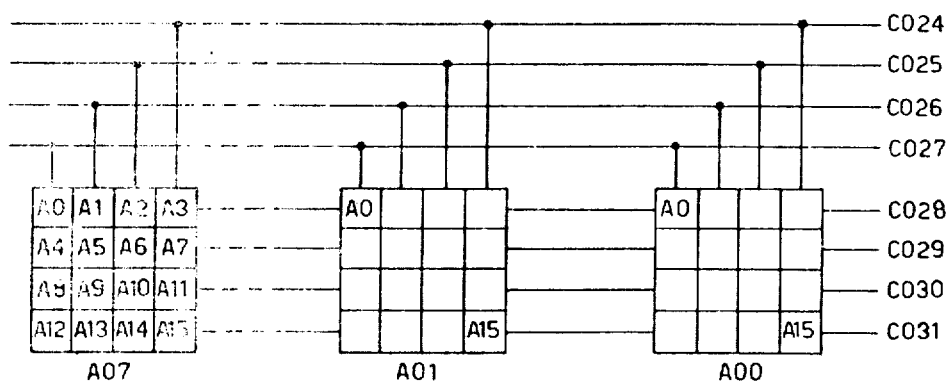
FIG. 7 shows the operative registers 30.

To select a register, for example the register A15, it is sufficient to send on the eight select wires shown in FIG. 7 eight commands C02414 C031 having the following configuration: 10000001.

Of course, the commands C024 – C031 are generated by the sequence matrix 28, which takes account of the fields X and Y of its microinstructions for generating both the select commands (C024 – C031) and the state associated (forced into S0) with one of the two series of registers. More particularly, the state S043 selects one of the registers of the series B, while the state S042 selects a register of the series A. The state S010, on the other hand, is associated with a register having a length of sixteen bits and formed by the like A and B registers, this register being called a "Long Register" and indicated by the letter L. The writing of an item of information in one of the registers 30 with the information already recorded in the registers 42 and 43 is timed, as has been said, by the signal T5 (FIG. 2). At this instant, the commands CT04 – CT07 generated by the logic matrix 28 select the data to be transferred to the registers 31 and 32, four bits at a time. Thus it is possible to modify one of the registers A or B in one part thereof, leaving the other part unchanged.

6. ARITHMETIC UNIT 35

The arithmetic unit 35 executes arithmetical and logical operations on the contents of the operative registers 30.

It is constituted by two adders UA-37 and UB-36 with eight-bit parallelism and a logic network UC-38. The two adders 37 and 36 (UA and UB) are interconnected according to well-known techniques as to obtain a single adder with sixteen-bit parallelism. However, only in particular operations, that is when a long register (L) is operated on, are all the sixteen outputs of the adder significant.

The network UC-38, which may enter UA as first operand, performs the logical OR, AND and exclusive-OR functions.

By means of a decoder 50 (FIG. 2b), the arithmetic unit 35 moreover supplies information on the result of the arithmetical and logical operations which are stored in the switching device D02 in consequence of the commands CD11 and CD12 generated by the logic matrix MLS-28. This switching device is then read according to the instructions SAD0 and SADI to effect conditional jumps.

There is given hereinafter in Table C a list of microinstructions which concern the arithmetic unit 35, in which appears the symbolic name of the commands CU00-CU09 generated by the MLS-26 which effect the transfer of the data, and the states of validity of the commands.

TABLE C

| Micro-Instrn. | CU00 | CU01 | CU02 | CU04 | CU05 | CU06 | CU07 | CU08 | CU09 | State of Validity |
|---|---|---|---|---|---|---|---|---|---|---|
| ADDB | 1 | 0 | 0 | 0 | 1 | X | X | X | X | S002 |
| DCA | 0 | 0 | 0 | 1 | 0 | X | X | X | X | S004 |
| AND | 1 | 1 | 1 | 1 | 0 | X | 0 | 1 | 0 | S002 |
| ANDA | 1 | 1 | 1 | 1 | 0 | X | 0 | 1 | 0 | S002 |
| ANDB | 1 | 1 | 1 | 1 | 0 | X | 0 | 1 | 0 | S002 |
| ORA | 1 | 1 | 1 | 1 | 0 | X | 1 | 0 | 0 | S002 |
| ORE | 1 | 1 | 1 | 1 | 0 | X | 0 | 0 | 1 | S002 |
| ROMA | 1 | 1 | 0 | 0 | 0 | 0 | X | X | X | S001 |
| TAB | 1 | 1 | 0 | 1 | 0 | 0 | X | X | X | S002 |
| TBA | 1 | 1 | 0 | 1 | 0 | 0 | X | X | X | S002 |
| MAIP | 1 | 1 | 0 | 0 | 0 | 0 | X | X | X | S004 |
| AMIP | 1 | 1 | 0 | 0 | 0 | 0 | X | X | X | S004 |
| MBIP | 1 | 1 | 0 | 0 | 0 | 0 | X | X | X | S004 |
| BMIP | 1 | 1 | 0 | 0 | 0 | 0 | X | X | X | S004 |
| MBI | 1 | 1 | 0 | 1 | 0 | 0 | X | X | X | S004 |
| AMI | 1 | 1 | 0 | 1 | 0 | 0 | X | X | X | S004 |
| BMI | 1 | 1 | 0 | 1 | 0 | 0 | X | X | X | S004 |

NOTE: X = immaterial

7. THE SWITCHING ELEMENTS (40)

The switching elements 40 comprise eight flip-flops (D00-D07) which staticize events which occur during the execution of some microinstructions. Their contents are tested during the execution of the microprograms to condition the making of address jumps in the addressers of the ROM 2. The logical microinstructions (AND, OR, etc.) affect them automatically for depositing the result of the logical operation carried out.

Each individual switching element can moreover be positioned at ZERO or at ONE by the microinstructions REDI and SEDI, respectively (Table A).

In the format of the microinstruction (Table A) the three least significant bits of the field X constitute the binary address (00-07) of the switching element concerned.

Some microinstructions (TADI-TBDI-SADI) force the eight bits of the register A or B selected into the eight switching elements (see Table A).

Some arithmetical and logical microinstructions (AND, OR, ORE, ADD), on the other hand, position the switching elements with their qualitative result; more particularly, the switching element D0I staticizes the occurrence of a zero result output by the arithmetic unit 35.

The switching elements 40 change their state at two different times. The switching elements D00-D03 change over with the signal T4N, while the switching elements D04-D07 change over with the signal T4A. Given hereunder is Table D, which contains the microinstructions concerning the switching elements 40 and the commands enabling the switching elements themselves which are generated by the MLS 28.

TABLE D

| Microinstrn. | CDRR | CU05 | CD11 | CD13 | CD14 |
|---|---|---|---|---|---|
| REDI | 1 | 0 | 0 | 0 | 0 |
| DCA | 0 | 0 | 1 | 0 | 0 |
| AND/A/B | 0 | 1 | 1 | 0 | 1 |

TABLE D-continued

| Microinstrn. | CDRR | CU05 | CD11 | CD13 | CD14 |
|---|---|---|---|---|---|
| OR/A/B | 0 | 0 | 1 | 1 | 0 |
| ORE | 0 | 0 | 1 | 0 | 1 |
| ADD/A/B | 0 | 1 | 1 | 0 | 0 |
| TADI | 0 | 0 | 0 | 1 | 1 |
| SADI | 0 | 0 | 0 | 1 | 0 |
| TBDI | 0 | 0 | 0 | 0 | 1 |

8. SHIFT NETWORK 41

Through this network formed by circuits of the AND-OR type it is possible to open a flow of information among all the possible flows towards the input network (NA, NB) to the operative registers (31, 32). The shift network 41 is formed by a group of eight gates divided into two sub-groups connected to the operative registers RA-31 and RB-32, respectively. Each of these sub-groups is capable of performing a shift or a rotation on the data coming from the operative registers 30, as is shown synbolically in FIG. 2b. Each gate of the two sub-groups is addressed by a combination of three bits of the microinstructions SHSB and ROTB which act on this network. These combinations are indicated symbolically in FIG. 2b by the symbols CZ00-CZ07, while the other two gates of the network 71 are commanded in direct manner and serve to force the conditions of the switching elements or zero. An input to the shift network 41 is moreover constituted by a gate 70 which is connected to the channel logic 45 by means of the data introducing channel D. This gate 70 permits the introduction of the data coming from the peripheral units through the medium of the logic 45 into the operative registers 30 through the nodes NA or NB.

9. INPUT NETWORK TO THE OPERATIVE REGISTERS

This is a network to which the operative registers 31 and 32 lead; the network enables the byte which is to be sent to and written in the operative registers 31 and 32 to be selected.

This network is formed by the nodes NA and NB and the registers BA-42 and BA-43.

The nodes NA and NB are two networks, each with parallelism of eight bits, which select the eight possible flows of information to the operative registers 31 and 32 by means of commands CA00-CA07 generated by the MLS 28.

The information selected may come in fact from the following units:
- the arithmetic unit 35 (two flows);
- the shift network 41 (ND);

- the ROM 2;
- the RAM 1;
- the console 7 (two flows);
- the channel logic 45.

The registers BA-42 and BB-43 staticize the information present on the nodes NA and NB and selected by one of the commands CA00-CA07 in the presence of the signal T4. The contents of BA-42 and BB-43 may or may not be written in the operative registers 31 and 32 according to whether the commands CT04-CT07 hereinbefore described are activated or not.

10. NETWORK PROVIDING CONNECTION TO THE RAM 1

The central unit 3 is connected to the input of the memory RAM 1 through the medium of a node N0 with parallelism of 16 bits (N000-15). This node is activated during the execution of the microinstructions for writing into the memory and for reading from the memory.

In both cases the node N0 supplies the address which it is desired to access; only in response to the writing microinstructions does it send the character (eight bits) to be stored.

The output of the RAM 1 is constituted by a node NC with parallelism of eight bits (NC00-07) and is used for reading.

All the microinstructions which provide for reading from or writing in the RAM 1 are executed in three machine cycles: in the first cycle S000 the interpretive state takes place; in the second cycle S004 the address in the RAM 1 at which the microinstruction operates is sent through the node N0.

The registers which can be connected to the node N0 as addressers are the register R0-26, if it is desired to access an address lower than 255 (that is say, the reserved zone of the RAM 1), or a pair of registers (AB or BA), if it is desired to access any address whatsoever of the RAM 1. In FIG. 2, the addressing commands of the memory RAM 1 are represented by the commands CM03-CM07. The command CM03 enables the register R0, while the commands CM04 and CM05 enable the registers RA-31 and RB-32.

From the state S004 the machine passes to the state S002 or the state S003, according to the type of microinstruction being worked out.

The machine passes to the state S002 for all those microinstructions in which it is a B register which supplies the item of data to be written or receives the information read.

It passes to the state S003, on the other hand, when it is an A register which is concerned in the reading or writing.

Within the limits of the states S002 and S003 it is necessary to distinguish two different functionings: (1) in the writing microinstructions there is sent, accompanied by the signal T2, the item of data to be written in memory (at the address already specified in the state S004) through the medium of the first eight bits (N000-07) of the node N0. The output NC of the memory is not significant and is not used.

The information which can be written may come from the registers RA-31, RB-32 or from the peripheral units through the medium of the channel logic 45 when the commands CM04, CM06 and CM07, respectively, are generated by the MLS 28.

(2) In the reading microinstructions, on the other hand, the node N0 is not significant and is not used by the RAM 1. Instead, the output NC is of importance and can be sent to a B register if the state S002 and the command CA05 are present, or to an A register if the state S003 and the command CA05 are present.

In Table E are listed the microinstructions using the RAM 1, with the respective commands and states generated by the MLS 28.

TABLE E

| MICRO-INSTRN. | State S004 COMMANDS | | | State S002 COMMANDS | | | State S003 COMMANDS | | |
|---|---|---|---|---|---|---|---|---|---|
| | CM03 | CM04 | CM05 | CM04 | CM06 | CM07 | CM04 | CM06 | CM07 |
| AMD  | 1 | 0 | 0 | 1 | 0 | 0 |   |   |   |
| MAD  | 1 | 0 | 0 | X | X | X |   |   |   |
| MAIP | 0 | 1 | 1 |   |   |   | X | X | X |
| MBIP | 0 | 1 | 1 | X | X | X |   |   |   |
| AMI  | 0 | 1 | 1 |   |   |   | 1 | 0 | 0 |
| AMIP | 0 | 1 | 1 |   |   |   | 1 | 0 | 0 |
| BMI  | 0 | 1 | 1 | 0 | 1 | 0 |   |   |   |
| BMIP | 0 | 1 | 1 | 0 | 1 | 0 |   |   |   |

All the blocks of the central unit 3 and also all the commands generated by the MLS 28 for controlling the flow of information between the blocks themselves have been set forth in the foregoing description. The MLS 28 has not been described in detail, however; this is nothing but a matrix having as rows the outputs of the registers 26 and 27 and as columns the conductors on which the commands C are generated. The MLS 28 is moreover conditioned by the timer 20 to generate the commands in the desired sequence.

For further details on the MLS 28, reference should be made to the book "Microprogramming, Principles and Practices" by Samir S. Husson, published in 1970 by Prentice-Hall Inc., Englewood Cliff, N.J., United States of America. In Chapter 2, the principle on which a sequence of commands adapted to execute microinstructions is generated is explained with reference to concrete examples.

11. CHANNEL LOGIC 45

The channel logic 45 is a complex of circuits adapted to handle and coordinate the exchange of data and commands between the central unit 3 and the peripheral units 4 connected thereto, excluding the console 7, which has direct access to the central unit 3 through the node NA-NB.

A detailed description of the channel logic 45 is given in British Pat. No. 1,329,753 corresponding to the U.S. application Ser. No. 494,973 which is a continuation in part of U.S. application No. 92,777 filed in the name of the Applicants.

At the present time it is desired only to make it clear that the channel logic 45 handles the microinstructions among the various priority levels present in the processor on the basis of a predetermined order of priority.

The reason for inserting the channel logic 45 is therefore to permit interruption of the microprogram in progress in order to execute an interrupting microprogram having greater priority.

In this particular embodiment there are four priority levels of microprograms, that is:

The main microprogram or microprogram of priority 4, which normally has the function of interpreting and executing the instructions of the program by processing the data and starting the input and output operations;

A microprogram of priority 3, normally intended for executing operations which do not come within the predetermined time sequence of the program, for example prearrangement of interrupts of the program, microprogrammed handling of input-output operations;

Microprograms of priorities 2 and 1, normally intended for effecting the transfer of data from a peripheral unit to the memory or vice versa.

With each microprogram there is associated an addressing register as shown in FIG. 8.

More particularly, level 4 is addressed by the register L00, level 3 by the register L01, level 2 by the register A13 and level 1 by the register A12.

scribed in detail hereinafter, performs the following operations:

Interprets the current instruction (Phase ALFA);
Recognizes the program interrupts;
Starts the interrupt program by recognizing whether it is recorded in the RAM 1 or in the ROM 2;
Inhibits all interrupts, including that of the program in the starting stage;
Enables reading from the RAM 1 or from the ROM 2 according to whether the interrupting program resides in the RAM 1 or in the ROM 2;
Recognizes the formats of the instructions;
Extracts the operands; and,
Carries out the instructions by starting the microprograms associated therewith (Phase BETA).

More particularly, the ZRM comprises a register PSR-300 (FIG. 9) which contains the parameters of the program in course of processing and is constituted by the following registers (see Table F):

TABLE F

| REG. No. | NAME | ABBREV. | NUMBER OF BYTES | ADDRESS FROM | ADDRESS TO | |
|---|---|---|---|---|---|---|
| 310 | BASE REGISTER | RB | 2 | 00B0 | 00B1 | |
| 311 | POINTER 1 | P1 | 2 | 00B2 | 00B3 | |
| 312 | POINTER 2 | P2 | 2 | 00B4 | 00B5 | PSR-300 |
| 313 | PROGRAM CONDITIONS | CP | 1 | 00B6 | — | |
| 314 | INTERRUPT RESERVATION | PI | 1 | 00B7 | — | |
| 315 | INSTRUCTION MODIFN. | MI | 1 | 00B8 | — | |
| 320 | BASE REGISTER | RB | 2 | 00D0 | 00D1 | |
| 321 | POINTER 1 | P1 | 2 | 00D2 | 00D3 | |
| 322 | POINTER 2 | P2 | 2 | 00D4 | 00D5 | |
| 323 | PROGRAM CONDITIONS | CP | 1 | 00D6 | — | OPSR-301 |
| 324 | INTERRUPT CODE | CI | 1 | 00D7 | — | |
| 325 | INSTRN. MODIFN. | MI | 1 | 00D8 | — | |
| 327 | OPSR ADDRESS | IR | 2 | 00DA | 00DB | |
| 333 | PROGRAM CONDITIONS | CP | 1 | 00BC | — | |
| 334 | ENABLE INTERRUPT | AI | 1 | 00BD | — | IPSR-302 |
| 335 | INTERRUPT ADDRESS | II | 2 | 00BE | 00BF | |
| 350 | STOP ADDRESS | IS | 2 | 00EC | 00ED | — |
| 351 | DBG SERVICE BYTE | BSD | 1 | 00C7 | — | — |
| 352 | WORKING REGISTER REFERENCE TABLE | RL | 8 | 00A8 | 00AF | — |
| 353 | ADDRESS | ITR | 3 | 00D4 | 00D6 | — |

Figure 2B:
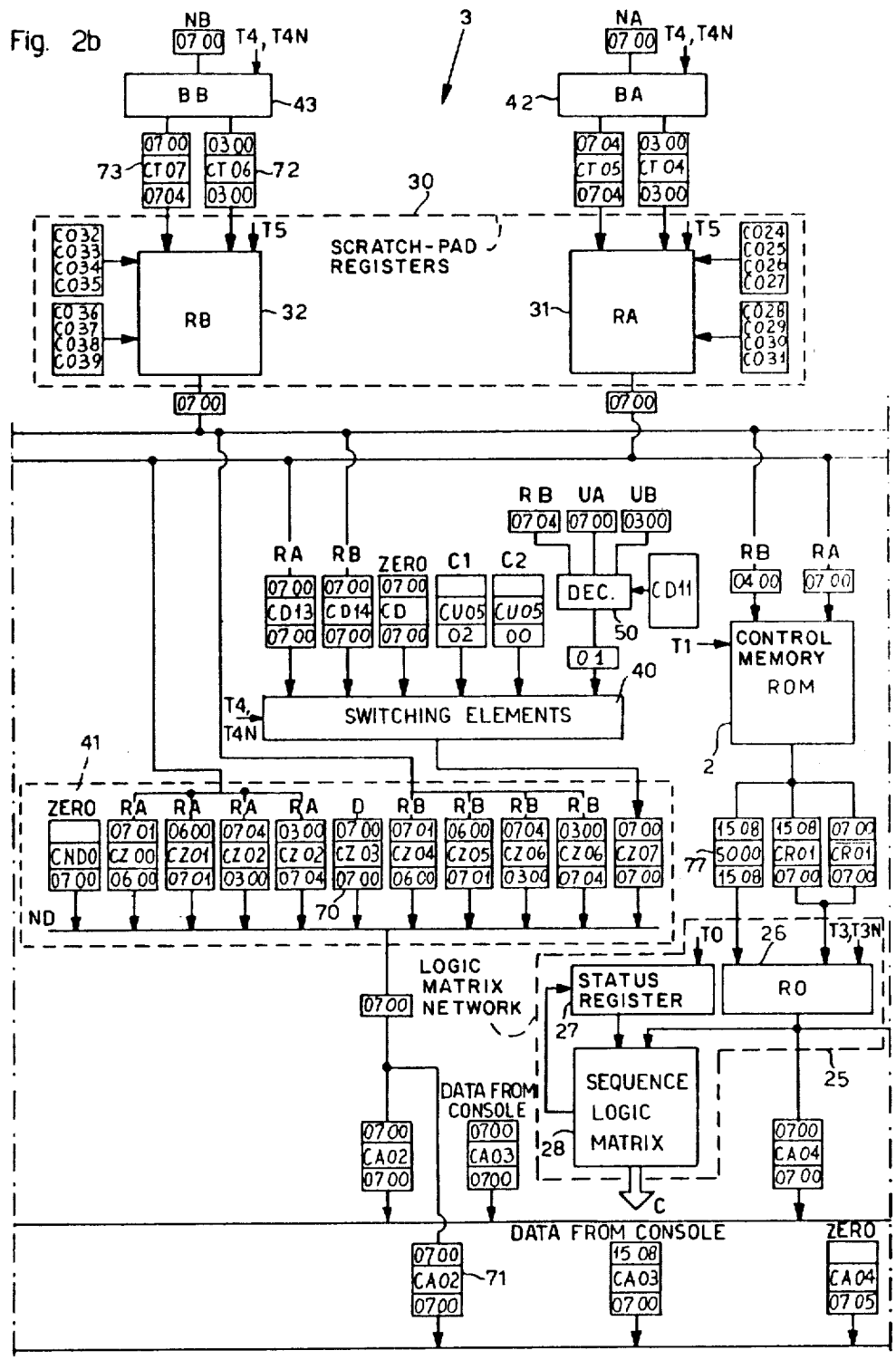
FIG. 2 shows how FIGS. 2a, 2b and 2c fit together to make up a diagram of the central unit.
Figure 2C:
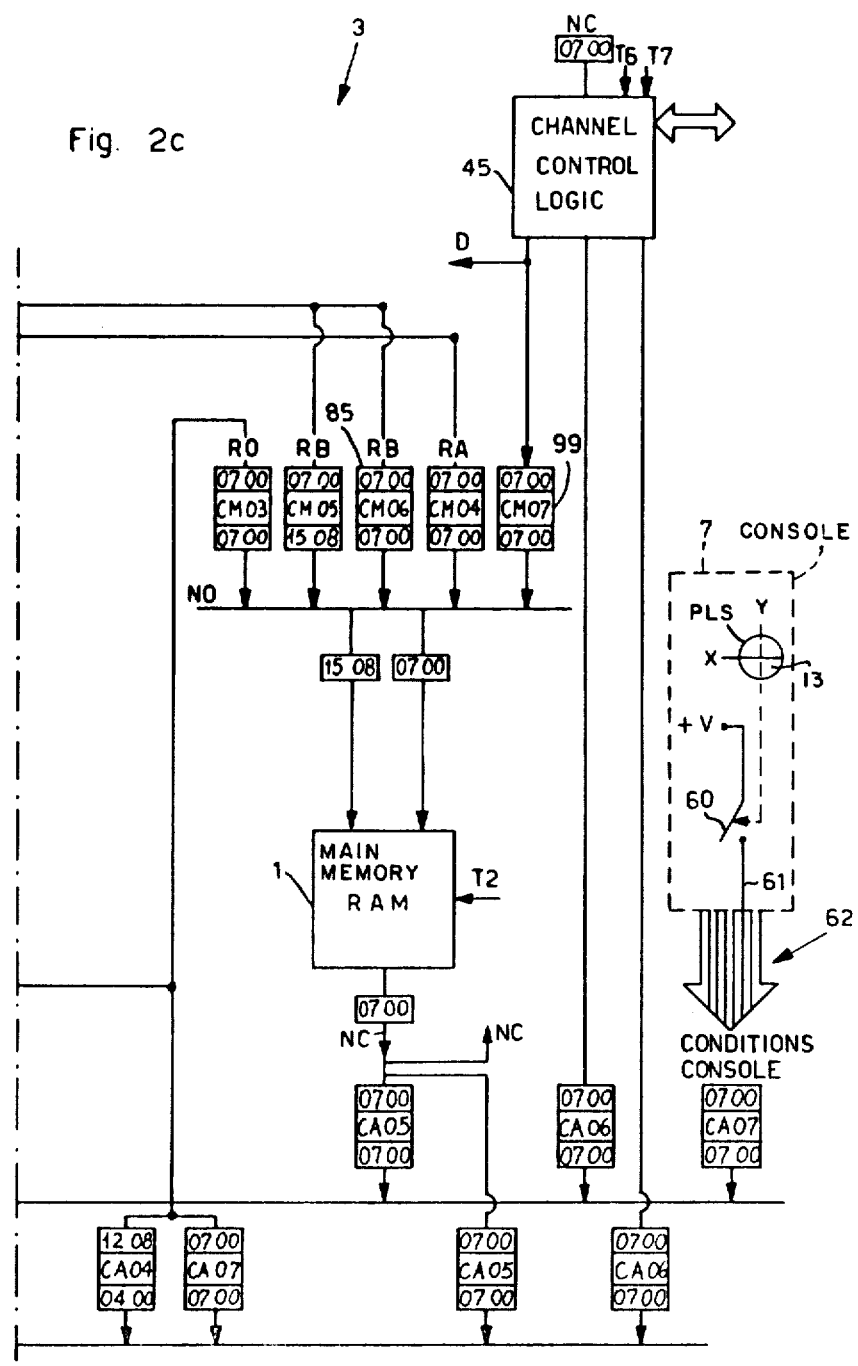

The transfer of the data from the peripheral units to the central unit 3 may take place in two modes, The first is handled by the gate 99 which permits direct access to the RAM 1 through the node N0 (FIG. 2c). This gate is controlled by the microinstructions for direct access to the RAM 1 which have already been described hereinbefore. The second mode is handled by the gate 70 of the node ND-41 and permits access to the operative registers 31 and 32 through the nodes NA and NB. The data and commands from the peripheral units which are recorded in the operative registers 30 and 31 are processed directly by the set of microinstructions which work on the registers.

DETAILED DESCRIPTION OF THE RAM 1 AND THE ROM 2

A description of the RAM 1 will now be given with reference to FIG. 9. The first zone, called the reserved zone (ZRM), is at the disposal of the interpreter microprogram and the microprograms handling the peripheral units.

The second zone, on the other hand, is intended for recording the programs to be performed, the data on which these programs operate and the results of the processing operations.

Before describing the RAM 1 in detail, it is necessary to mention briefly the operations performed by a special microprogram residing in the ROM 2 and called the interpreter. This microprogram, which will be de- A base register RB-310 which contains the initial address of the memory zone available for normal programs. The register RB-310 is used by the interpreter for computing the addresses of the operands expressed in the instructions. It is modified by suitable instructions during the execution of a program.

Pointer registers P1-311 and P2-312; these are registers used by particular instructions for computing the absolute address of the operands. These addresses are obtained by adding P1-311 or P2-312 to the base register RB-310. Their contents can be modified by special instructions.

The program conditions byte as shown in FIG. 9c has the following significance: The bits 00,01 are called the condition code (CC) and are compiled by the arithmetic and logical instructions for storing the significant results. These conditions are then sensed by other instructions for executing conditional jumps. The bit 02 indicates, if at the 1 level, that the program being executed is program X; if at the 0 level, it indicates that program Y is being executed. The bit 03 is used by the interpreter to establish whether the instruction to be executed is to read from the RAM 1 (bit 03 = 1) or from the ROM 2 (bit 03 = 0). The bit 04, if at 1 level, enables biprogramming, if at 0 level, renders the bit 02 non-significant. The bit 05 is normally at one and is used to enable interrupts by the programmer because of DBG (debugging)

requests and is put to zero by the interpreter when the interrupt is activated. The bits 06, 07 are not used.

The Interrupt Reservation Byte (O1-314 of FIG. 9a) is used by the interpreter to actuate a request for an interrupt contained therein.

An interrupt is actuated if the AND between P1 and CP is different than zero, as will be explained hereinafter (interpreter section). The byte P1 is compiled by the microprograms associated with causes of interruption originating both from the central unit 3 and from the peripheral units 4.

The Instruction Modification Byte (MI-315 of FIG. 9a) is used by the interpreter to modify the second byte of the instruction to be executed and can be compiled by the programmer as a function of results of preceding instructions.

The bytes 316, 317 and 318 are used for other purposes which do not concern the invention and they are therefore not described.

The ZRM moreover comprises another register OPSR-301 which serves to contain the parameters of the interrupted program. The OPSR-301 is compiled by the interpreter by taking the corresponding registers and byte from the register PSR-300. When the interrupt program terminates, the last instruction is always for resumption of the interrupted program, that is to say it is an instruction which transfers OPSR-301 to PSR-300. More particularly, the register OPSR-301 comprises the following:

The registers RB-320, P1-321, P2-322, CP-323, MI-325, 326, receive the contents of the corresponding registers 310–316 of PSR-300.

The register 324 contains the interrupt code CI (FIG. 9d), that is, the code of the cause of interruption in the course of processing the program being executed. It is compiled by the interpreter before the interrupting program is activated. The causes of interruption specified by the CI are divided into five uniform classes each handled by a different microprogram. To each class there corresponds one bit of the CI; more particularly, classes 1 and 2 each correspond to a single cause of interruption and are identified by the bits 01 and 02, respectively. Classes 3, 4, 5 are identified by the bits 05, 06, 07, respectively, and each comprises a plurality of causes of interruption 16 causes at the most) identified by the bits 00–03.

The reason for recording the interrupt code CI of the cause of interruption in OPSR-301 is the fact that the resumption or non-resumption of the interrupted program really depends on the type of interrupt. For example, if the cause of interruption is such that the interrupted program cannot be resumed, then the interrupt program ends by calling the operator. Only after intervention by the operator will it be possible for the interrupted program to be resumed.

The register IR-327 contains the re-entry address of PSR-300 to which corresponds the instruction which is to be executed at the instant of reentry.

It is compiled by the interpreter by transferring the contents of the operative register L07 (program addresser) at the time of the interrupt.

The zone ZRM moreover comprises a register IPSR-302 which serves to contain the parameters of the interrupt program. The register comprises a byte CP-333 which indicates the program conditions associated therewith. The byte CP has the significance described in FIG. 9c and is transferred to the register CP-313 by the interpreter at the instant of the enabling of the interrupting program.

The register ISPR-302 moreover comprises the interrupt program address II-335 (FIG. 9a), which is loaded into the register L07 of the registers 30 of FIG. 2b by the interpreter if the interrupt program is recorded in the RAM 1.

The register 302 moreover comprises the interrupt enable byte AI-334 represented in FIG. 9e, in which the bits 01-02-05-06 and 07, if at 1 level, indicate that the programs corresponding to the respective interrupt classes are recorded in the RAM 1, and, if at zero level, that the programs are recorded in the ROM 2.

More precisely, the interpreter carries out the logical AND function between the interrupt code CI and the interrupt enable byte AI. If the logical AND is zero, this signifies that the program associated with the interrupt is recorded in the ROM 2, if it is one, that the program is recorded in the RAM 1.

In the first case, the interpreter forces the contents of the register II-335 into the operative register L07; in the second case it forces therein the address in the ROM 2 of the beginning of the zone B reserved for the DBG programs. The zone ZRM moreover comprises a register IS-350 shown in FIG. 9 which contains the STOP address at which the operator desires to halt the processing of the program. The ZRM moreover comprises a DBG service byte (BSD-351).

Referring to FIG. 2c, through the medium of the change-over switch 19 the console 7 activates a switch 60 which is connected directly to the node NA through the wire 61 forming part of the channel 62.

If the change-over switch PLS-19 is in position X, the switch 60 is open and therefore the wire 61 is at zero level. As has been said, this corresponds to selecting program X. On the other hand, when the change-over switch PLS-19 is in position Y, the switch 60 is closed, so that the wire 61 is at one level. The position of PLS-19 corresponding to one of the two logical levels of the switch 60 is periodically sensed or tested together with the other console conditions by a microprogram of priority level 3. This microprogram transfers to location $\phi\phi\phi 8$ (CL400) of the ZRM a character having inter alia a bit which copies the signal present on the wire 61.

This microprogram essentially comprises a microinstruction TCCA (Table A) and a microinstruction AMD.

Figure 10:
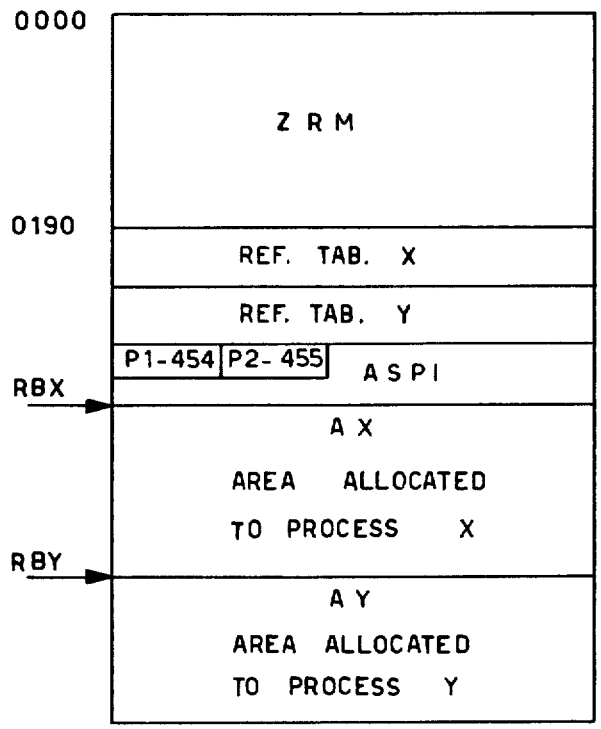
FIG. 10 is a diagram of the RAM 1.

The timer 20 generates every 60 milliseconds a signal TM which causes an interrupt in the microprogram of level 4 (that is the interpreter microprogram) and executes the microinstruction addressed by the register L01 (addresser of the microprogram of level 3). This microinstruction forms part of a predefined sequence of microinstructions which corresponds to a microprogram GESA which carries out the exchange of the parameters of program X with those of program Y and vice versa, using an area of memory designated ASPI (FIG. 10).

A brief description will be given of the mechanism of handling of the biprogramming which (as hereinbefore mentioned) permits the execution in parallel of two programs resident in the RAM 1.

For the purpose of making the concept of biprogramming clear, the following definitions will first be given. Process: this is the execution of a program in an area of memory. A process may be of internal type or of external type if it involves some peripheral unit.

Program: this is the list of instructions which define the process.

It follows from these definitions that the according system is used in monoprogramming if it handles a single process.

The work of biprogramming is handled by a microprogram called GEB (biprogramming handler), which permits execution of the two processes.

cess X or process Y is activated by analyzing the bit 02 of the byte CP-313.

HANDLING OF THE DISPLAY

Hardware

Figure 11:
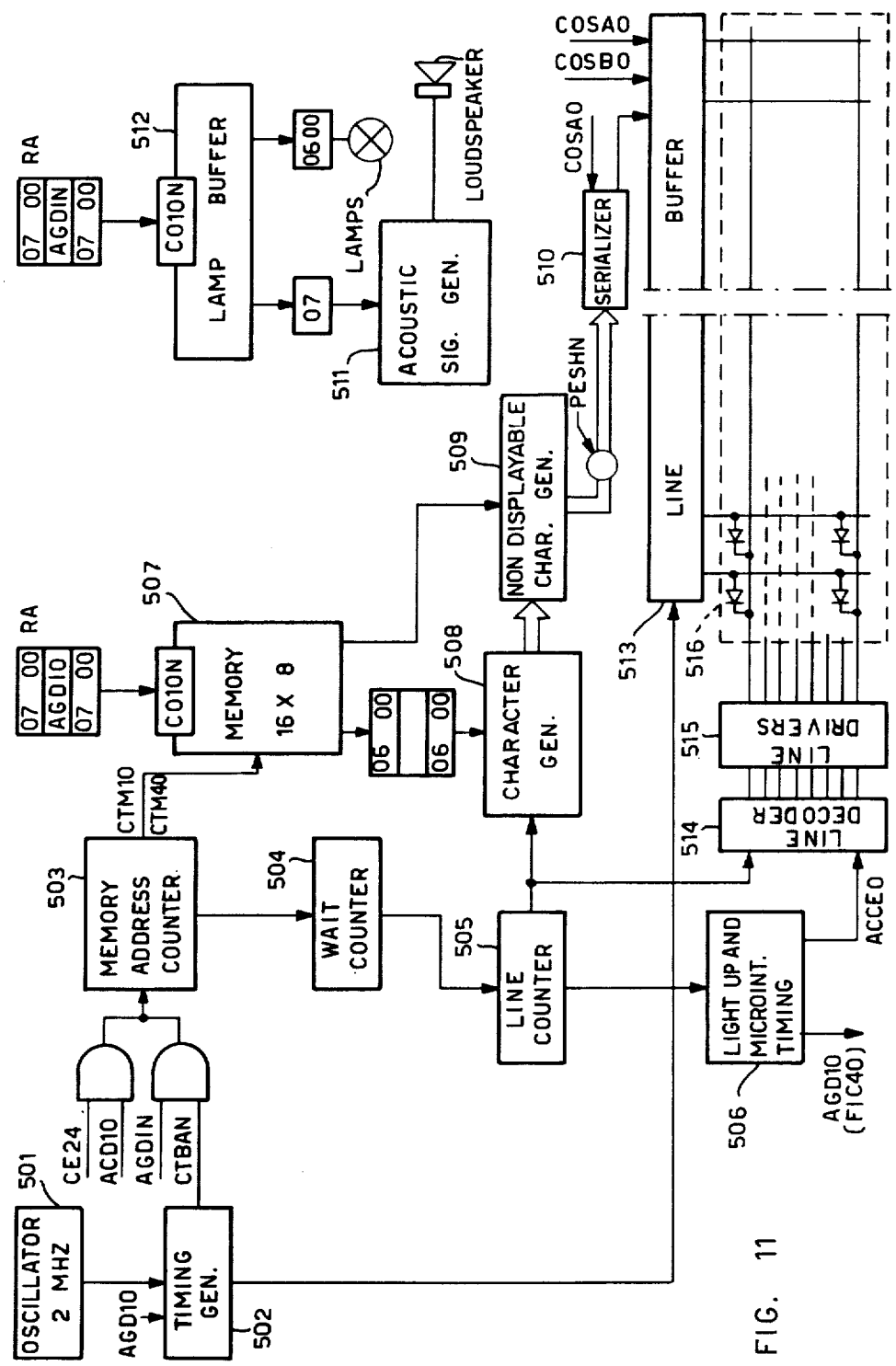
FIG. 11 is a block diagram of the display controller.
Figure 12:
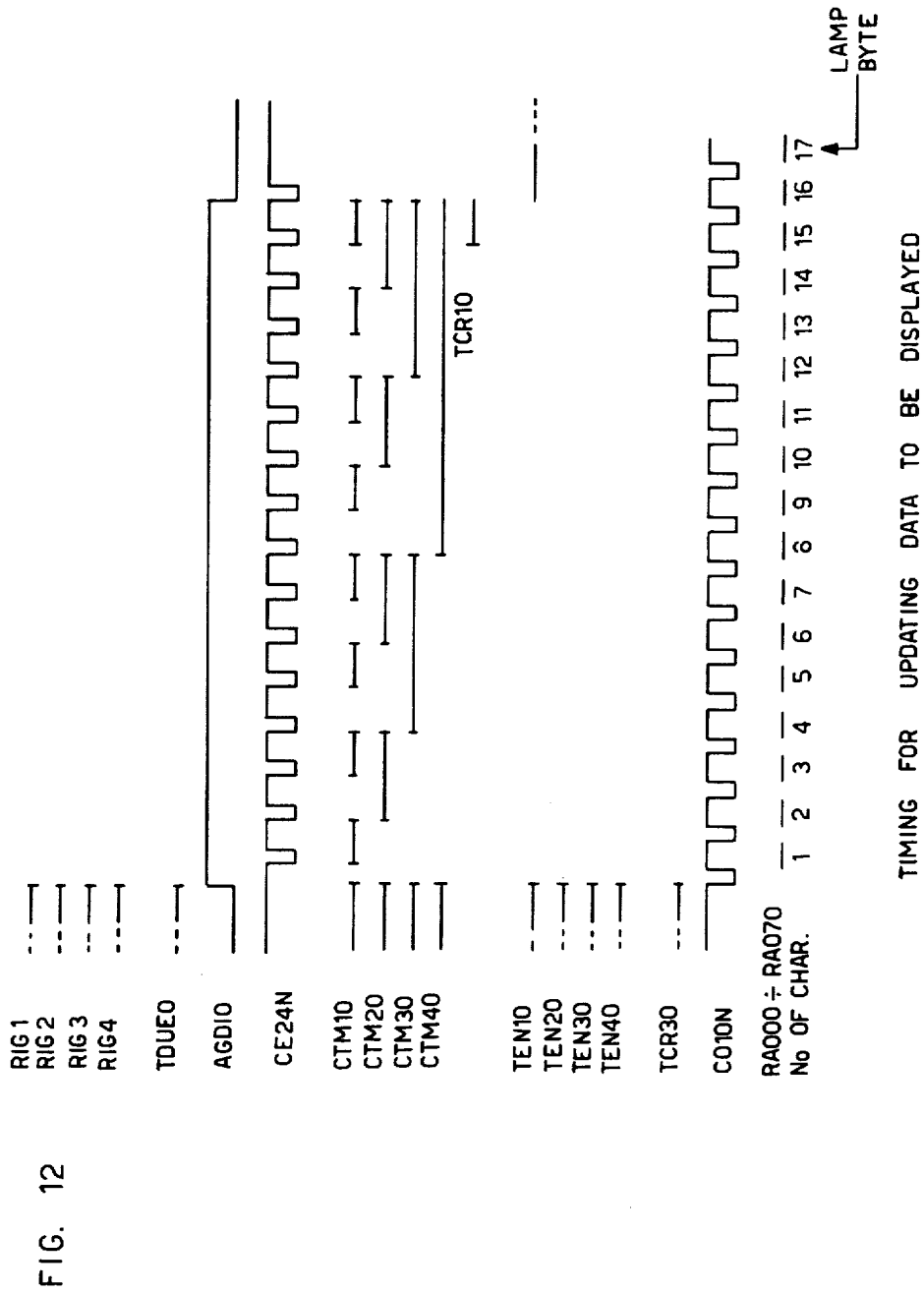
FIG. 12 shows the timing of the updating stage of data to be visually displayed.
Figure 13A:
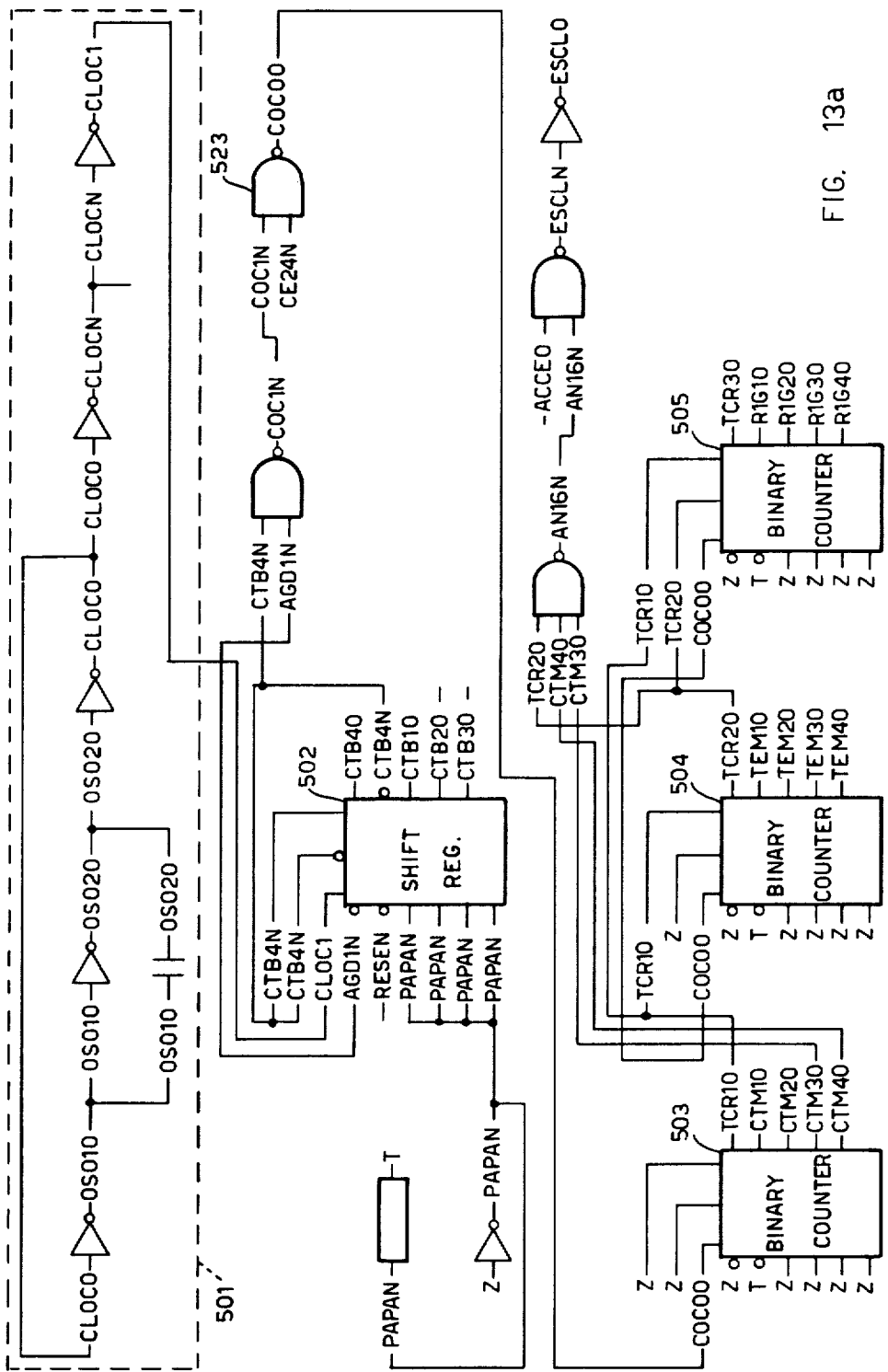
FIGS. 13a and 13b comprise a detailed diagram of the timing and addressing circuits.
Figure 13B:
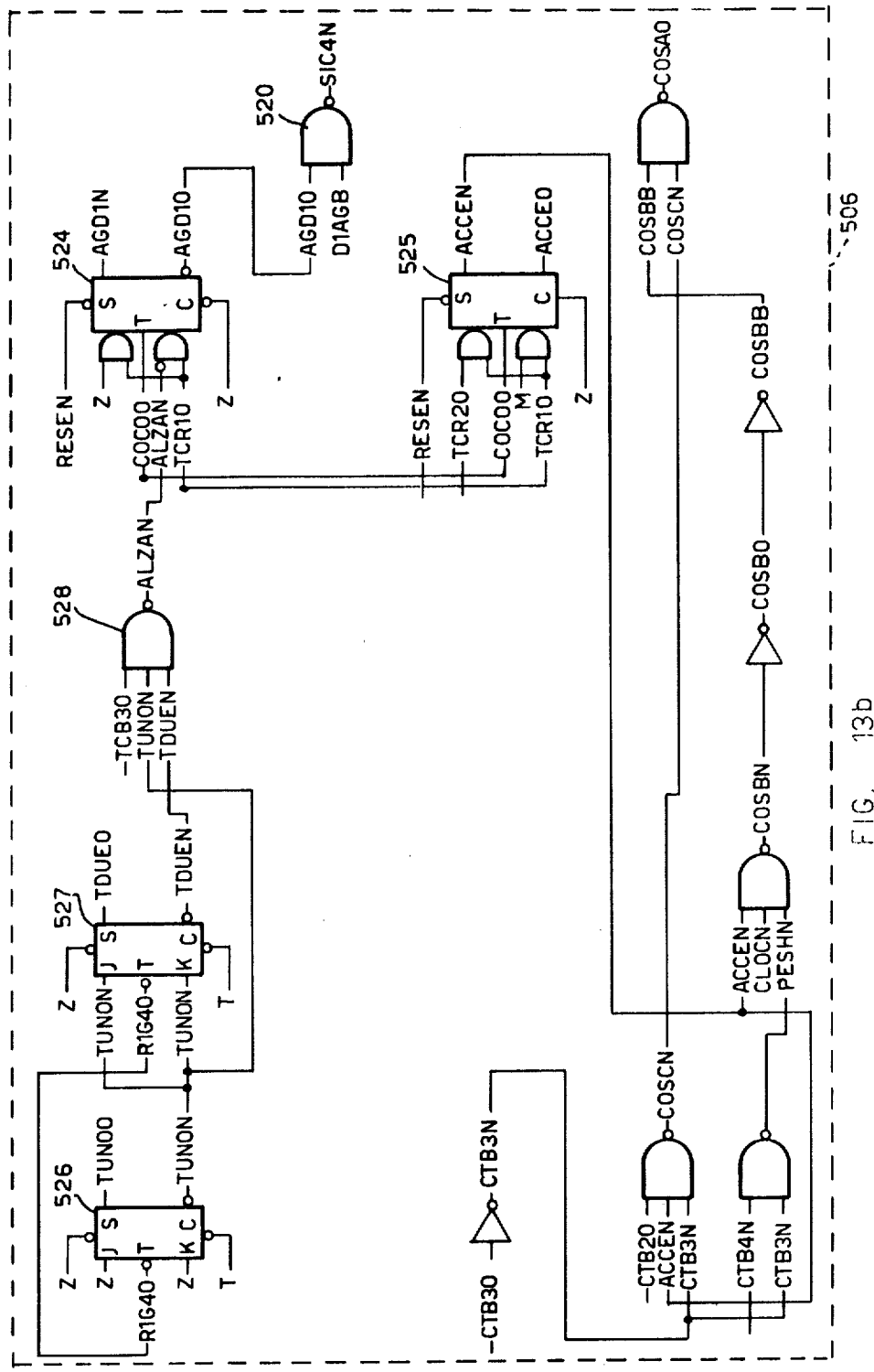

There will now be described the hardware or control unit 300 required for handling the display, the block diagram of which is given in FIG. 11. An oscillator 501 generates a square wave having a frequency of two million Hz. A first generator 502 generates the synchronism signals COSAO, COSBO, PESHO of the internal

TABLE G

| ASPI LOCATIONS | ZRM LOCATIONS | SIGNIFICANCE |
| --- | --- | --- |
| 0 – 11 | 0090 – 0.9B | SERVICE FOR MICROPROG. |
| 12 – 13 |  | ALLOC. ADDR. OF PROGRAM |
| 14 – 19 | 00A2 – 00A7 | SERVICE FOR MICROPROG. |
| 20 – 27 | 00A8 – 00AF | AUXILIARY REGISTER |
| 28 – 29 | 00B0 – 00B1 | BASE REGISTER |
| 30 – 311 | 00B2 – 00B3 | POINTER 1 |
| 32 – 33 | 00B4 – 00B5 | POINTER 2 |
| 34 | 00B6 | PROGRAM CONDITIONS |
| 35 | 00B7 | INTERRUPT RESERVATION |
| 36 | 00B8 | INSTRUCTION MODIFICATION |
| 37 | 00B9 | CURRENT REFERENCE |
| 38 | 00BA | TYPE OF EDITING |
| 39 | 00BB | FILLING CODE |
| 40 – 43 | 00BC – 00BF | STATE OF INTERRUPT PROG. |
| 44 | 00E3 | SERVICE FOR MICROPROG. |
| 45 | 00E4 | ENABLING OF BARS |
| 46 | 00E5 | ENABL. OF PROGRAM KEYS |
| 47 – 49 | 00C4 – 00C6 | REFER. TABLE IDENTIFN. |
| 50 | 00C7 | SERVICE FOR MICROPROG. |
| 51 – 58 | 00C8 – 00CF | CONDITION REGISTER |
| 59 – 70 | 00D0 – 00DB | STATE OF INTERRUPTED PROG. |
| 71 – 86 | 0140 – 014F | D I R |
| 87 – 94 | ? – ? | DECA GUB 1 |
| 95 – 102 | ? – ? | DECA GUB 2 |

If the two programs describe processes of internal type, the GEB allocates equal periods of time to each of the two processes. If, on the other hand, at least one of the two processes is of external type, the GEB optimizes the waiting times by allocating them to that process which it is capable of operating.

From of has been said, the need to define the areas of memory in which each process can operate therefore emerges. The defining of these areas of memory is effected by the programmer by allocating a first value RBX to the base register RB-310 which defines the beginning of the area of memory allocated to process X. A second value RBY is associated with the beginning of the area of memory associated with process Y.

It is moreover necessary to define in addition to the zone ZRM of FIG. 9 an extension thereof called area ASPI which contains at any instant the parameters of the inactive process. A memory configuration as shown in FIG. 10 can therefore be obtained. The configuration of the data contained in the zone ASPI is given in the accompanying Table G. The definition of the initial address of area ASPI is compiled by the programmer in locations 00C0 – 00C1 of the zone ZRM.

From what has been said, it is clear that any instant the parameters of the active process will be present in the zone ZRM and in the operative registers 30, while those of the inactive process are contained in area ASPI. The accounting system therefore always carries out the processing operations associated with the active process, disregarding the inactive process.

As has been mentioned, the accounting system using the display in accordance with the invention can handle two programs by allocating control alternately to one of them. Finally, it is to be noted that the accounting system is able to recognize at any instant whether prooperations. A second timing generator 506 generates a timing signal ACCEO that command the lighting up of the lines of the display 516, and a second timing signal AGDIO that constitutes the microinterruption signal FIC40 for the processing unit 3. A first counter 503 generates the addresses of a memory 507 in which are recorded the 16 characters coming from a register RA of the central unit. The 17th character loads a register 512 for the lighting of the console lamps. A counter 504 serves as a wait counter for the generation of the line addresses of the display. Such an address, represented by the bits RIG10-RIG40, is generated by the counter 505. Moreover, the signals RIG10-RIG40 are used for addressing a ROM-508 adapted to generate the signals adapted to display visually on the display 516 the characters coming from the memory 507. A logic network 509 provides for generating a special character in the event of a character to be displayed coming from the memory 507 not belonging to the visually displayable group. The ROM-508 supplies seven blocks of five bits for each character to be visually displayed. These blocks are supplied to a serializer 510 which provides for filling a shift register 513. A timer 506 generates the signals for lighting up the lines of a display 516 through a decoding circuit 514 and an amplifying circuit 515.

The operation can be divided into three stages:

Stage 1. Updating of data to be visually displayed. (FIGS. 12, 13a, 13b, 14).

This is characterized by the signal AGD10 at the one logical level. Through the medium of the NAND element 520 (FIG. 13) this signal generates the signal SIC4N which constitutes a microinterrupt FIC40. This is generated every 60 msec and calls the display handling microprogram, causing a jump to the address IDIS0 (Table M). This microprogram will be explained hereinafter; it is merely stated in advance that it functions to supply the data to be visualized to the display. This data is sent on the channel RA000-RA070 and is validated by the signal C010N. The first sixteen characters are stored in the memory 507 and the seventeenth character is stored in the lamp buffer 512. The signal WEN1N for writing in the memory 507 is generated by the NAND element 521 having the signals ADG10 and C0100 as input. Between one character and another the microprogram emits a special microinstruction (C0M14) which constitutes the signal CE24N. Through the medium of the NAND element 523 (FIG. 13), this signal, together with the signal C0C1N, generate the increment signal C0C00 of the counter 503 addressing the memory 507.

The microinstruction C0M14 (that is, the signal CE24N) which follows the sixteenth character causes, through the medium of the signal TCR10=1, the changer-over of the flip-flop 524, which sends the signal AGD1N to "1". Through the medium of the NAND element 522, this signal, together with the signal C0100 which accompanies the following character, generates the signal PELEN enabling writing in the lamp buffer 512. The seven least significant bits of the buffer 512, if at "1" level, cause the lighting-up of seven lamps. By means of the generator 511, the passage of the most significant bit from zero to one produces the activation of an acoustic signal with a duration of about 350 msec at a frequency of 800 Hz.

During the whole of this stage the display stays switched off.

Stage 2, Loading a line. FIGS. 15, 16, 17 and 18.

As has been said, in stage 1 the addressing of the memory 507 is controlled through the medium of the microprogram by means of the signal CE24N (microinstructon C0M14) which increments the addresser 503. the incrementation of the three the incrementation of the three counters 503, 504 and 505 is commanded through the medium of the signal CTB4N originating from the timing generator 502. The signal ACCE0 changes to "0", thus inhibiting the lighting-up or switching-on of the display 516. The counter 503 addresses the memory 507 at the character to be visually displayed. This character is decoded by the decoder 508. The memory bits ME000-ME070 together with the first three bits RIG10, RIG30 and RIG20 of the of the line counter form a nine-bit address for the ROM-508 which generates the character to be visually displayed. The output of the ROM-508 is composed of five bits in which the bits at "1" level will light up the corresponding dots of the matrix of the display corresponding to the first line of the character read from the memory. For example, if the character H has been read from the memory, the output of the ROM-508 corresponding to the first line will be 10001.

The output of the ROM-508 is loaded into the serializer 510 by means of the signal PESHN. The output of the serializer 510 is connected to the shift register 513, which forms the line buffer. The bits in the register 513 are shifted by the timing signals C0SA0 and C0SB0. It is to be noted that the ROM-508 is connected to the serializer 510 by way of the generator 509, which generates a special character for all the code combinations which are not visually displayable. The memory addresser 503 is incremented by one unit and the second location of the memory 507 is read. The character generation cycle is repeated (ROM-508, circuit 509 and serializer 510) and supplies the new configuration of lighted and unlighted dots corresponding to the first line, second character. Again this configuration is loaded into the line buffer 513 and the whole of the contents is shifted by five places. The above-described operations are repeated until the line buffer 513 is completely full. At this point, the address counter 503 has assumed the configuration "1111". This causes the change-over to one of the signal TCR10, which conditions the flip-flop 525 to set the signal ACCE0 which initiates the stage of lighting-up of a line.

Figure 19:
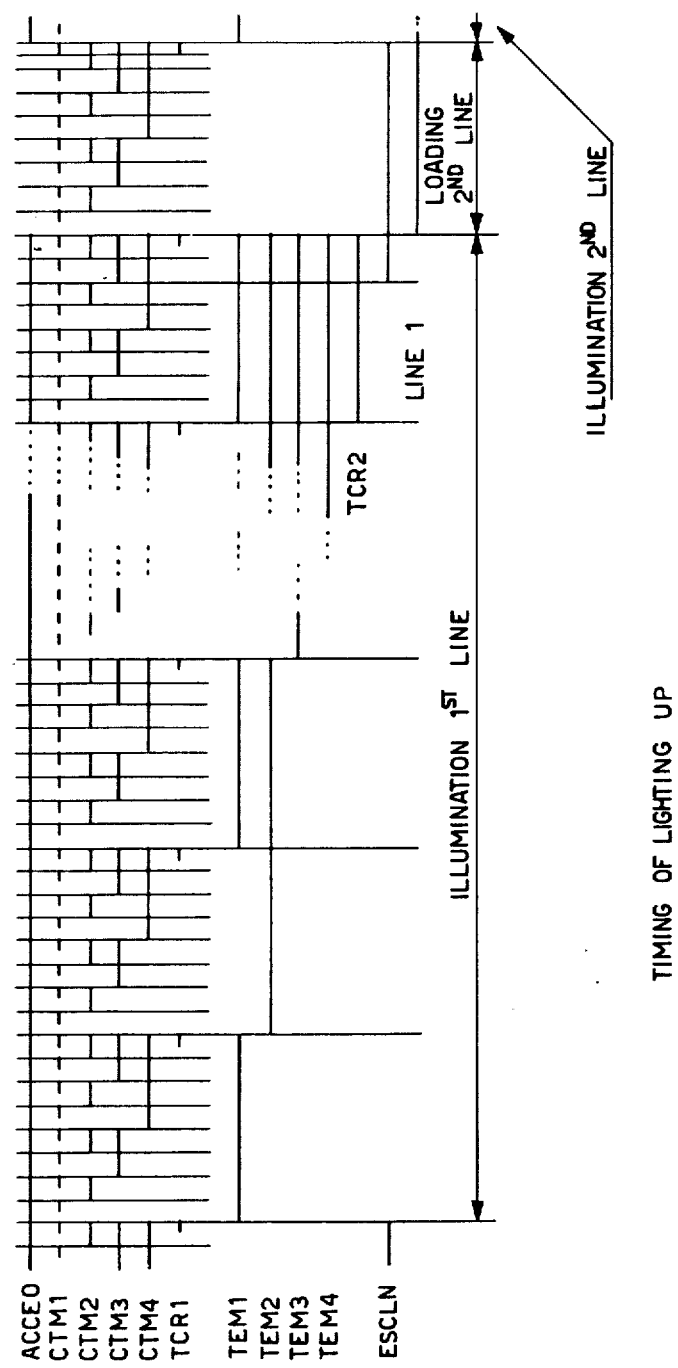
FIG. 19 shows the timing of the lighting-up phase of a line.

Stage 3, Lighting-up of a line. FIGS. 17 and 19

The signal ACCE0 = 1 (FIG. 13) enables the line decoder 514 (FIG. 17) to activate the driving circuits (530–536) of the seven lines of the display 516. The alternation of lighting-up of a line and loading of the following line is shown in FIG. 19. The dots of the display which will be illuminated are those corresponding to the bits of the line buffer 513 at one logical level. The time taken by the counter 503 and by the wait counter 504 determines the period of ACCE0. The signal ACCE0 is reset (flip-flop 525, FIG. 13) when the line counter 505 changes its configuration because of the carry (CR20) generated by the counter 504. The last two stages (loading and lighting-up of the line) are repeated 64 times, that is until the carry TCR30 has been obtained four times. This condition is stored by the two flip-flops 526 and 527 (FIG. 13), which generate the signals TUN00 and TDUE0, respectively. These signals, together with the carry TCR30, are applied as input to the NAND element 528, which generates the signal ALZAN. By means of the flip-flop 524 and the NAND element 520, the signal ALZAN generates the signal S1C4N which constitutes the microinterrupt FIC40. As mentioned hereinbefore, the microinterrupt FIC40 causes the reading of the microprogram handling the display which is described hereinafter.

Handling of the display

Figure 22:
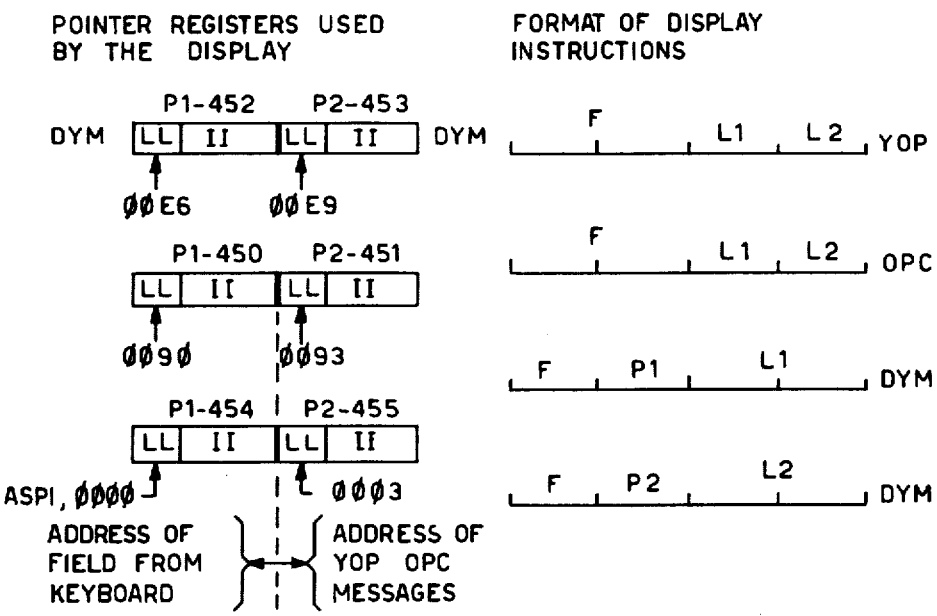
FIG. 22 shows the zones of the ZRM containing the parameters of the visual display areas.
Figure 20A:
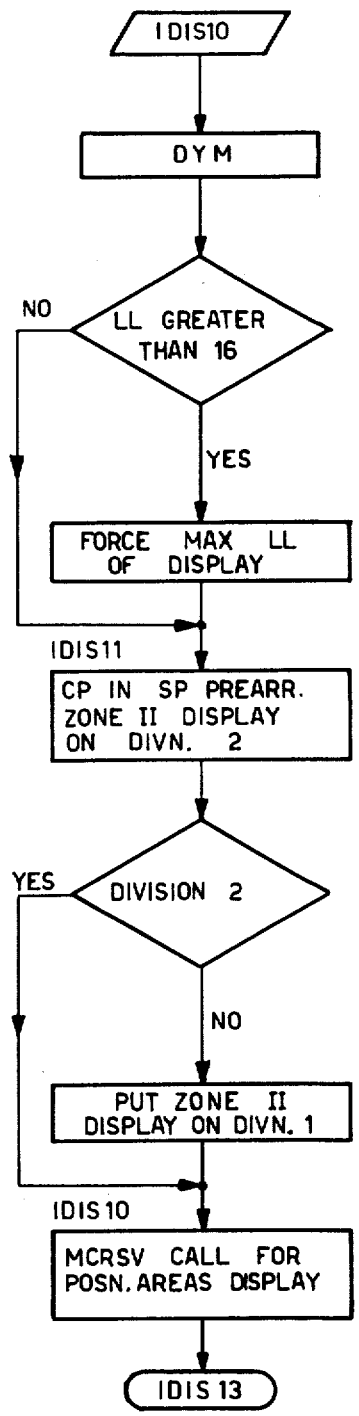
FIGS. 20a and 20b are a flow diagram of the execute phase for the visual display instruction (DYM)
Figure 20B:
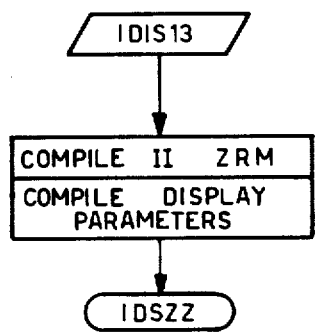
Figure 21A:
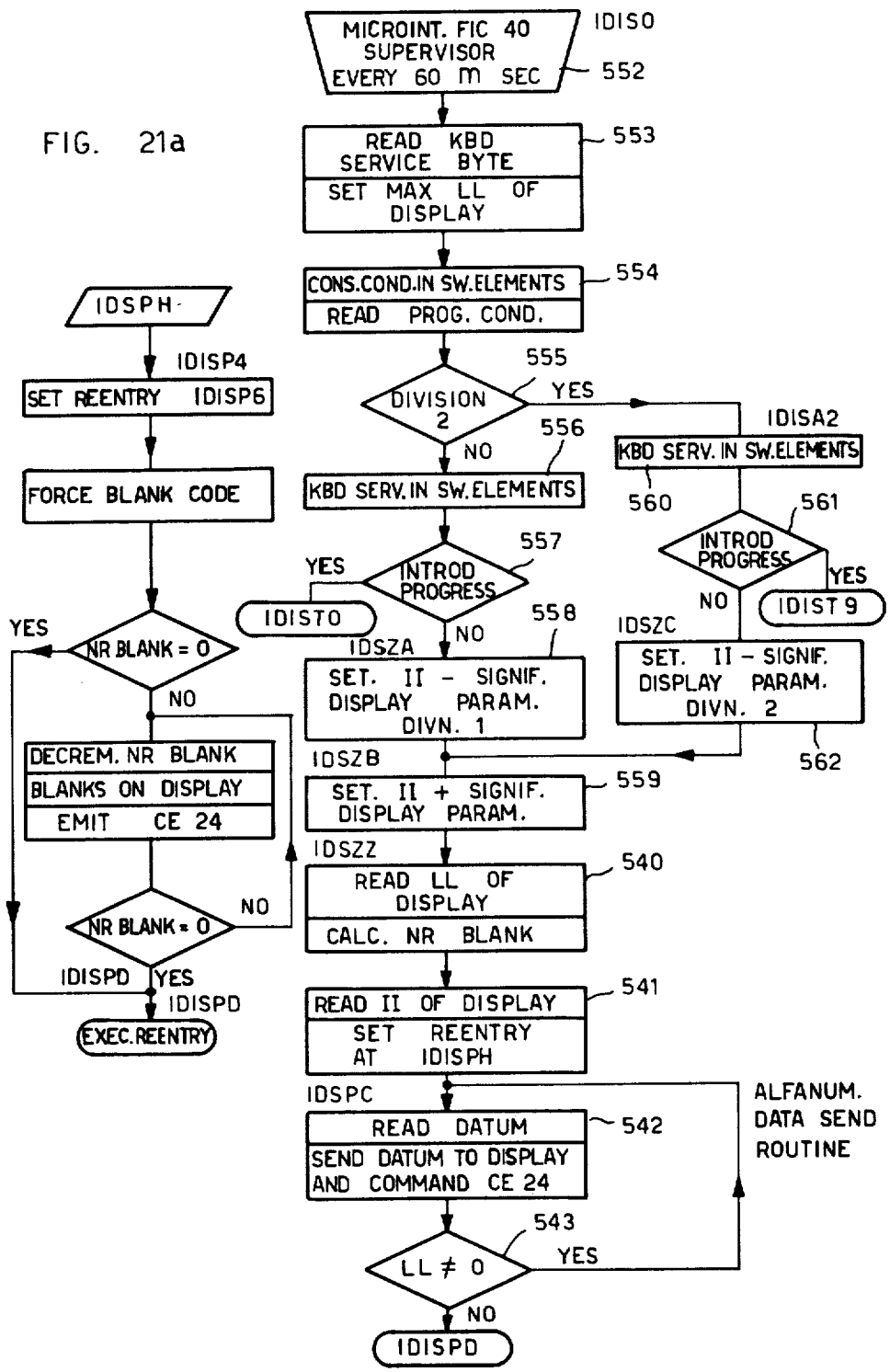
Figure 21B:
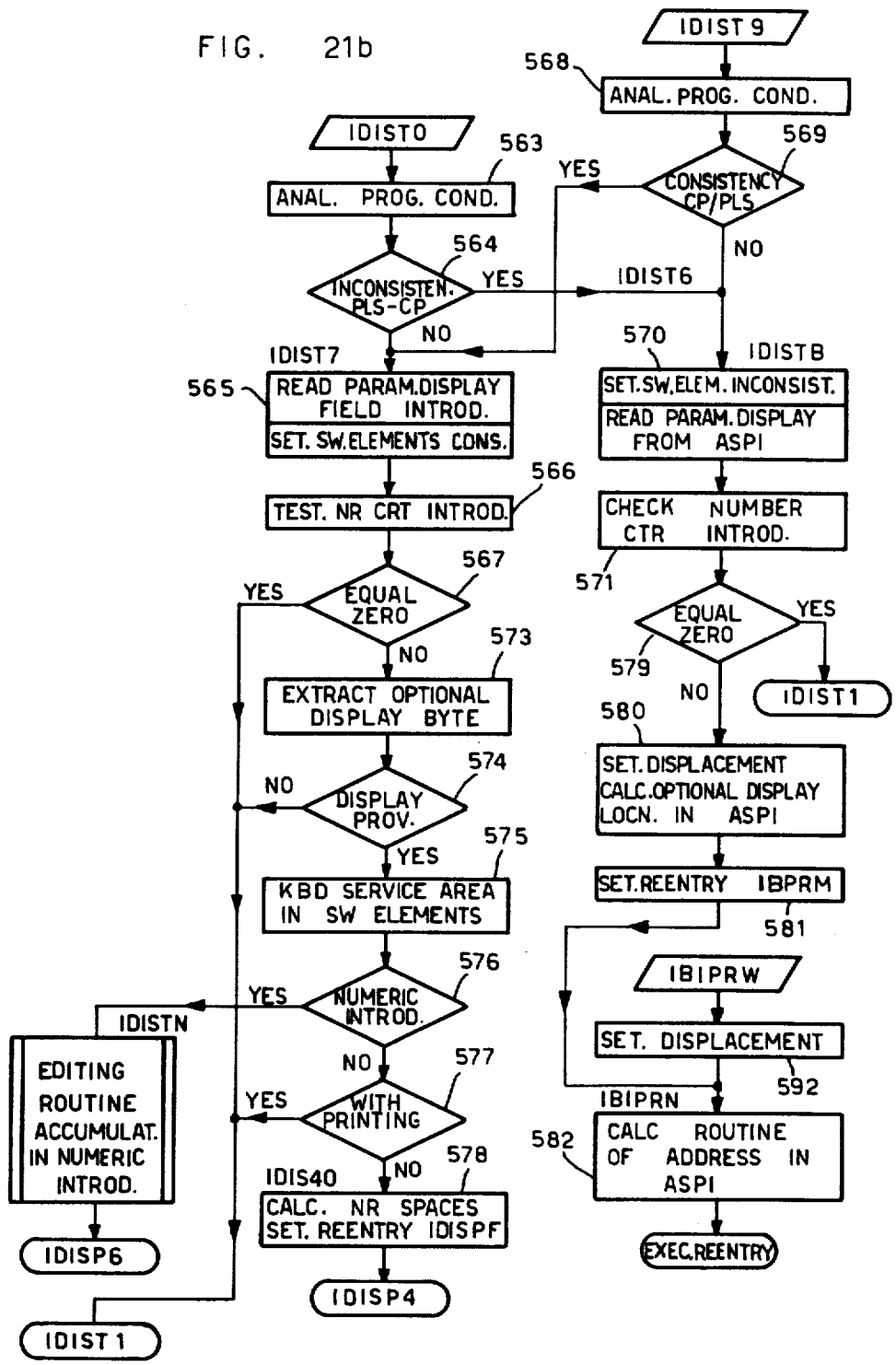

FIGS. 20, 21 and 22 - Tables H, L and M.

The functions described in paragraphs A, B, C and D given in the introduction are summarized in logical form in Table H. The areas of the ZRM containing the parameters of the zone to be visually displayed are shown clearly in FIG. 22.

They are a repetition of what is shown in FIG. 9a (for the zone ZRM) and in FIG. 10 (for the area ASPI). These zones are divided into groups of three cells, the first of which contains the number of characters to be visually displayed (LL), while the other two contain the absolute memory address of the first cell of the field (II). Of these zones, P1-452 is reserved for program X and P2-453 for program Y in the instructions DYM. The zone P1-450 is used for visually displaying the data introduced from the keyboard which relates to the program being executed, while the zone P1-454 is used for visually displaying the data introduced from the keyboard which relates to the program in ASPI. The zones P2-451 and P2-455 serve to display visually the messages of the instructions YOP (introduce and display visually for debugging) and 0PC (operator call). Of these zones the zone P2-451 is used if the introduction relates to the program being executed, while the zone P2-455 is used if the instruction relates to the program interrupted because of biprogramming.

The formats of these instructions are also given in FIG. 22. It can be observed from them how the instruction DYM may refer to the pointer P1 or P2 according to whether it is contained in program X or Y. The instructions YOP and OPC are of special type and are specially implemented for facilitating the removal of errors and, in general, the conversation between man and the computer.

The instruction YOP performs the following functions:
- visually displays on the display the sixteen characters of the registers 362 and 363 (FIG. 9b);
- transfers the data entered by the operator on the keyboard to the register 364 and visually displays this data (FIG. 9b);
- positions the condition code (contained in the byte CP-313) according to the bar 102 actuated by the operator.

This instruction is reserved for the special program-perfecting programs and therefore cannot be used by the normal programs.

The instruction OPC performs the function of calling the operator for removing a cause of arrest of the machine (for example, end of the program or ending of the paper in a printer). Like the instruction YOP, it visually displays sixteen characters of the registers 362 and 363, transfers the data entered on the keyboard to the register 364 (FIG. 9b) and visually displays this data, and lights up the lamp OPC (operator call).

As stated hereinbefore, the display is updated every 60 msec following a microinterrupt (FIC40) generated by the control hardware. Moreover, it visually displays the memory zone belonging to the program selected by the change-over switch PLS.

The microprogram handling the display is conditioned by two different situations:

A) No introduction of data from the keyboard is reserved (line 4, Table H)

In this case, the display visually displays the field of memory defined by the last visual display instruction DYM executed by the program. The microprogram of the execute phase of this instruction is given in Table L and the corresponding flow diagram in FIG. 20.

This microprogram begins by verifying that the length of the zone to be visually displayed is at the most sixteen characters (microinstructions CRTA, AND and SADI). This length has been prearranged by phase ALFA of the instruction, loading the register B15. In the case of a length greater than 16, the microinstruction CRTB forces 15 into the register B15. Then, by means of the microinstructions MAD and SADI, the byte CP-313 is taken and is put into the switching elements. The microinstruction CRTB which follows prearranges in the register B10 the address of the cell φφE9 (FIG. 22), which will thereafter be loaded with the length of the zone to be visually displayed relating to program Y. The microinstruction SADI examines the switching element D02 to establish which of the two programs is being executed. If this bit established by this element is at "1", program Y is being executed and the following instruction is therefore skipped. If, on the other hand, the bit is at "0", then the microinstruction CRTB is executed and loads into the register B10 the address of the cell φφE6, which will then be loaded with the length of the field to be visually displayed relating to program X. The microinstruction C0M1 which follows calls the supervisor, which completes the parameters necessary for visual display. These parameters are the length and address of the field to be visually displayed. The length is taken from the register B15 in which it has been prearranged, while the address is supplied by the long register L08 (microinstructions TBA, BMIP, BMIP and AMIP). A jump is then made (SAI) to the address IDISZZ where the characters are sent to the display and to the lamps.

The address IDISZZ forms part of the general display handling microprogram which is given in Table M. The corresponding logical flow is given in FIG. 21.

The block 540 (FIG. 21) reads the length of the field to be visually displayed and calculates the number of filling characters thereof (BLANK).

Figure 14A:
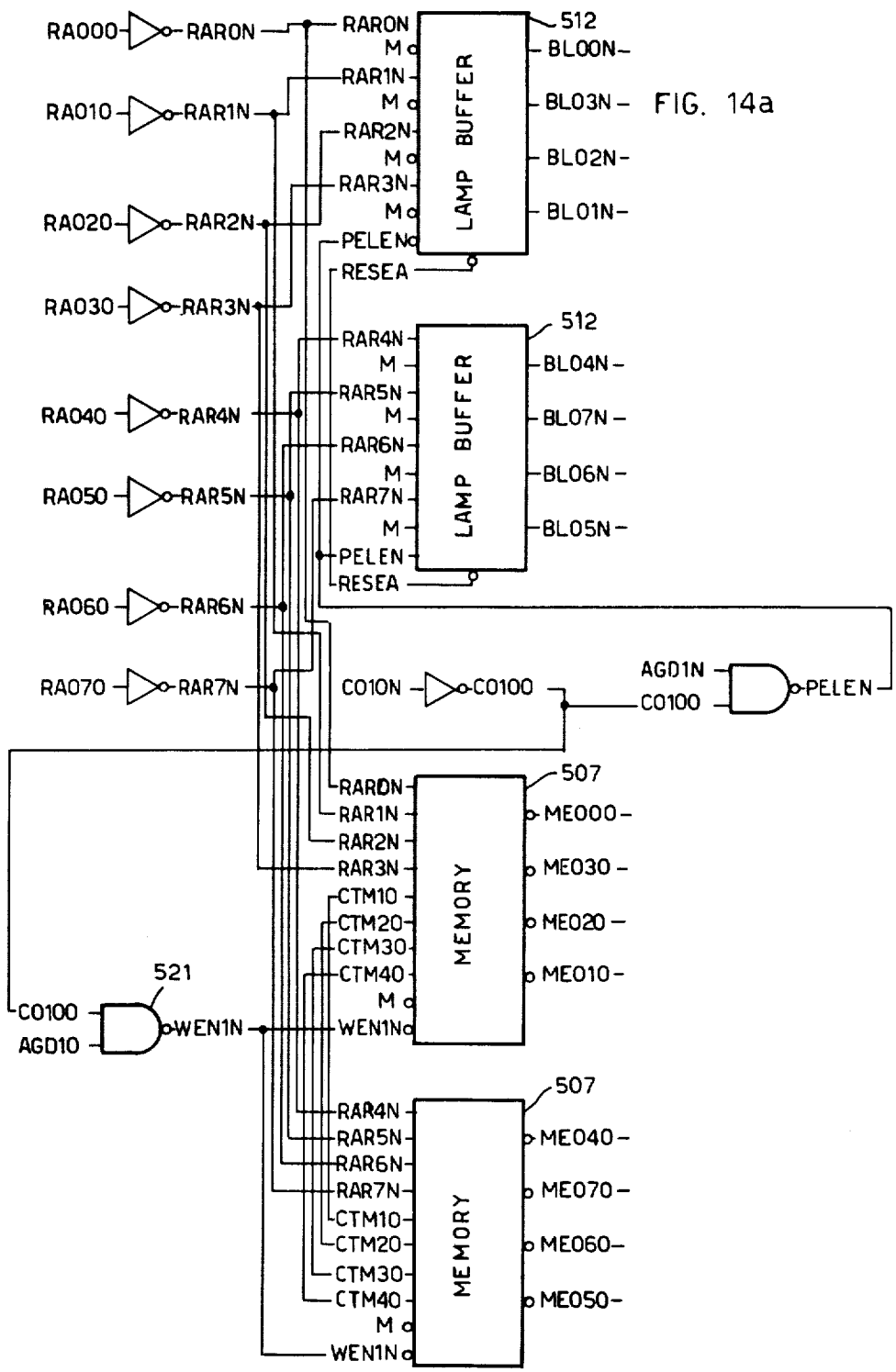
FIGS. 14a and 14b comprise a detailed diagram of the memory 507 and the lamp buffer 512.
Figure 14B:
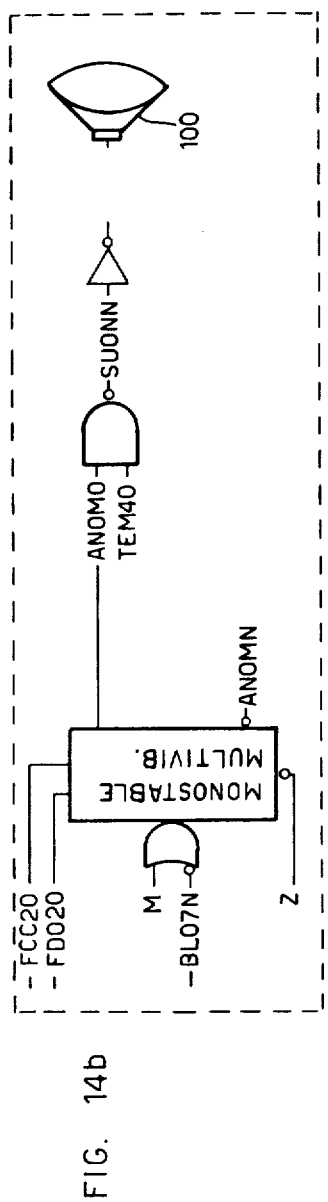
Figure 15:
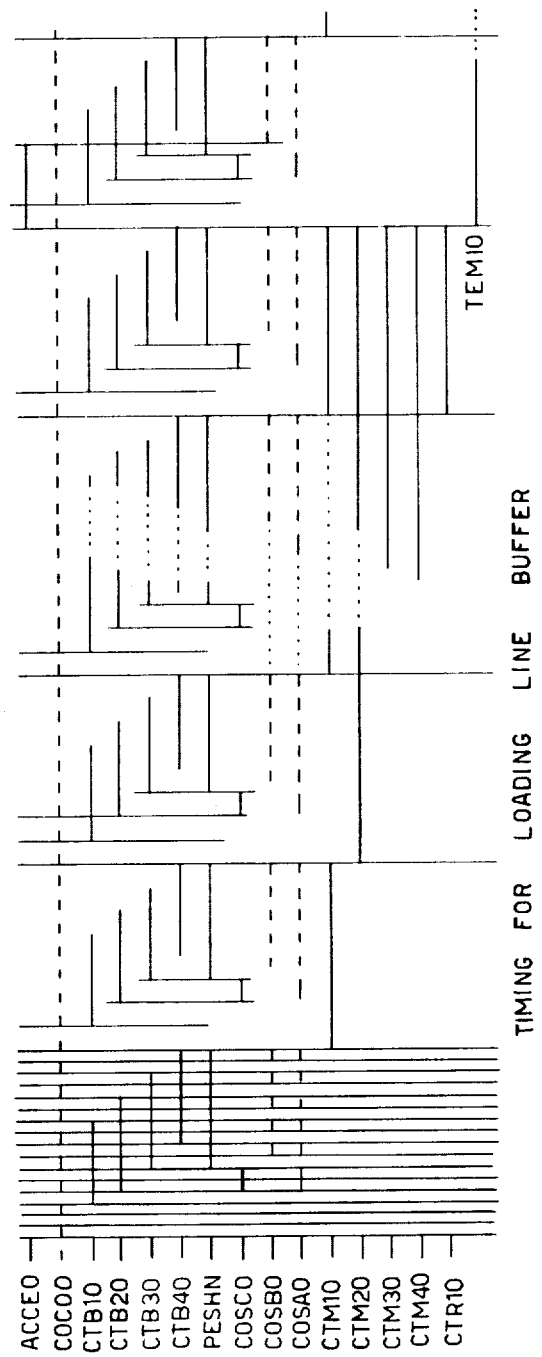
FIG. 15 shows the timing of the loading phase of the line buffer 513.
Figure 16:
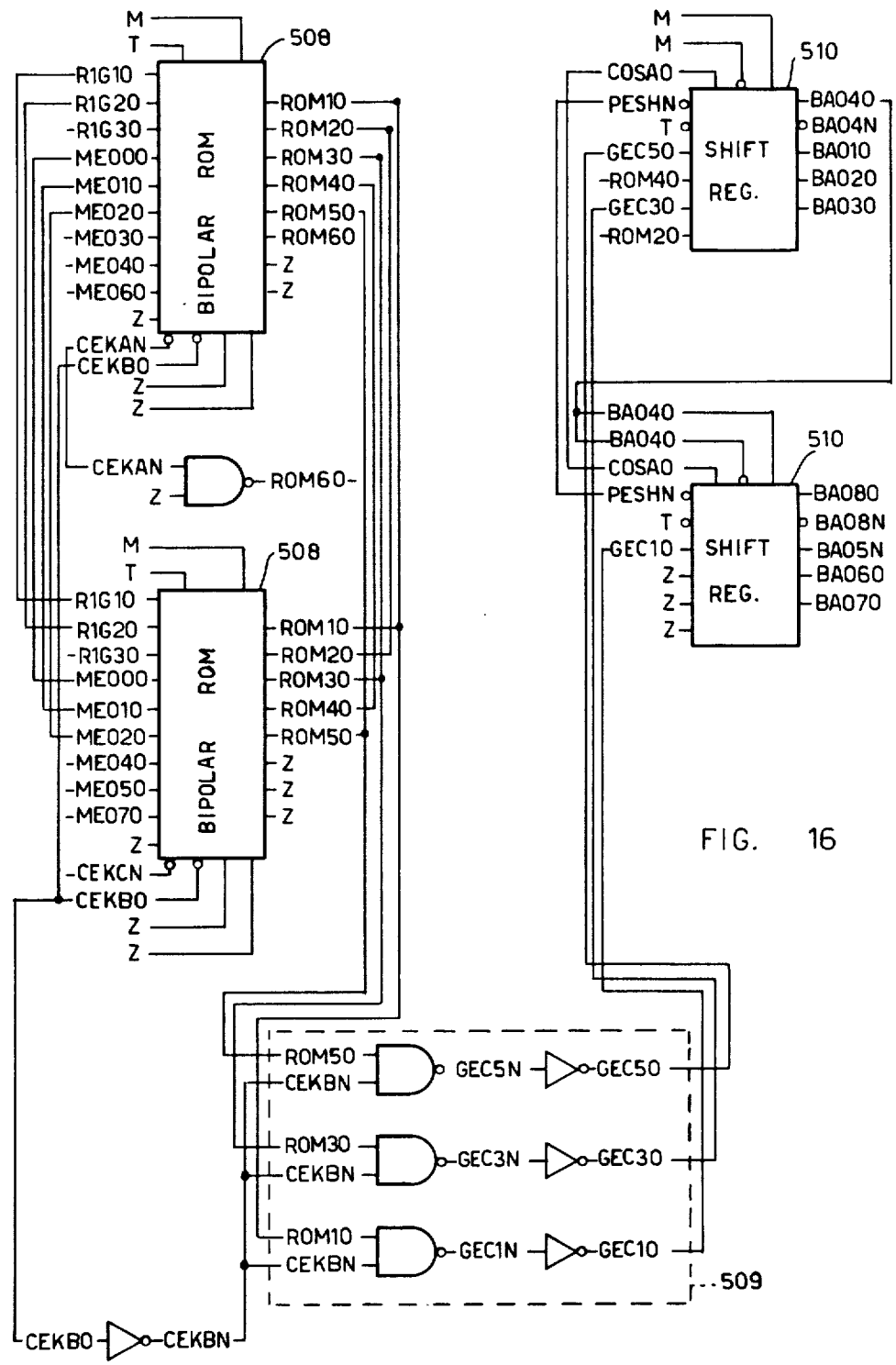
FIG. 16 is a detailed diagram of the ROM-508 generating the characters and of the serializer 510.
Figure 18:
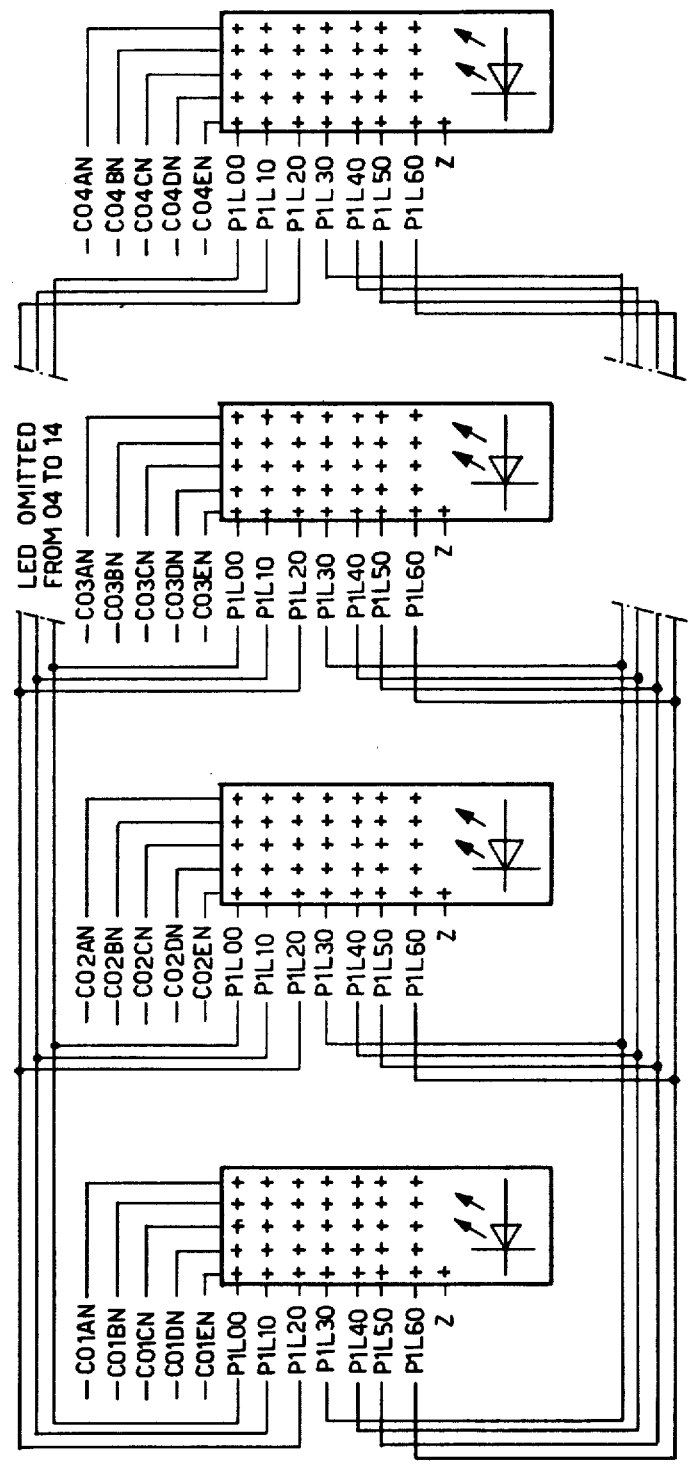
FIG. 18 is a detailed diagram of the first four elements of the display 516.

The block 541 reads the visual display address and prearranges reentry at the address IDISPH which has the task of completing the zone to be visually displayed with spaces. The block 542 and the logical decision 543 constitute the routine of sending alphanumeric data to the display. This routine in Table M begins at the address IDISPC and ends by returning to IDISPC if LL is greater than zero (microinstruction SADO, IDISPC). Otherwise, an unconditional jump is made to IDISPD, from which reentry takes place at the space sending routine (IDISPH). The routine IDISPC (Table M infra) comprises a microinstruction MAIP which reads the datum in the RAM at the address indicated by the register M08 and deposits it in the register A02, then increments the address M08 by one unit. The microinstruction DCB decrements by one the contents of the register B11 (length of the transfer) and if, after the decrementation, the contents of B11=0, sets the switching element D101. The microinstruction TABC then transfers the contents of the registers A02, B02 to the console, accompanying them with the command C0100. Finally, the microinstruction C0M14 is executed and sends the signal CE24N of FIG. 11 to one. The character present on the channel RA000–RA070 is stored in the RAM-507 (FIG. 14). The command C0100 permits the writing thereof through the medium of the NAND element 521. The signal CE24N increments by one the address at which the character is written by means of the NAND element 523 (FIG. 13). The operation of the control hardware from these signals has been described in detail in the preceding section.

When B11=0, a jump is made to IDISPC and from here to IDISPH, which provides for sending to the display as many spaces as there are unused characters. Obviously, this routine is very similar to the preceding one, with the variation that the character to be visually displayed (space) is generated by putting the byte "00100000" into the register A14 (microinstruction CRTA at the address IDISP4). The following routine (IDISP6) relates to the updating of the lamps located on the console.

This routing begins by taking BF-544 (address "φEF" of the ZRM) and depositing it in the register A02. The register B02 is then loaded with the byte containing the state of the logical lamps of the console (BL-545, address φφEE of ZRM).

By means of the microinstruction TCCA, the console conditions byte (corresponding to the byte CL-400) is loaded into the register A11 and the state of the change-over switch PLS is examined (microinstructions TCCA and TADI). If the change-over switch PLS is positioned at program X, a jump is carried out to the address IDISP5, where switching-off of the buzzer relating to program Y is prearranged. Otherwise, progress in sequence takes place prearranging the switching-off of the buzzer relating to program X. Then, at the address IDISP7 the byte lighting up the lamps is compiled (logics plus physics). This operation is executed by the microinstructions AZBM and ORA, corresponding to the block 549 of FIG. 21. Through the medium of the following microinstruction TABC, the contents of the register A02 are transferred to the register 512 (FIG. 11) of the control hardware of the display. The command C0100 which accompanies this microinstruction defines the validity thereof. Finally, the microinstruction C0M14 causes the appearance of the signal AGDIN (through the medium of the flip-flop 524 of FIG. 13), which, as described hereinbefore, together with the signal C0100, generates the signal PELEN for writing in the register 512 (FIG. 11). Then, by means of the microinstruction SAI, an unconditional jump is executed to the address IALFA where the interpretive phase of the following instruction begins. The execution of the instruction DYM which has just been described relates to the case given in the fourth line of Table H. The check as to whether an instruction for introduction of data from the keyboard is in progress is carried out in phase ALFA of the instruction DYM by examining the bit 03 of the byte BS-410 (recorded at the address $\phi\phi$DE) relating to program Y and the bit 02 relating to program X.

Data updating of the display takes place through the medium of the microinterrupt FIC40, which calls the supervisor every 60 msec. By means of a microinstruction SAI, the supervisor executes a jump to the address IDIS0 (block 552 of FIG. 21). Starting from this address there is recorded the microprogram which carries out the functions specified in Table H and relating to case b which follows. The microinstruction TCCA of this block loads the byte CL-400 (console conditions) into the register A08.

The block 553 is obtained by means of the microinstructions MAD and TADI and CRTA. This block transfers to the switching elements the byte BA-410, the bits 2 and 3 of which indicate (if at "1") that an introduction from the keyboard relating to program X or program Y, respectively, has been reserved. Moreover, this block prearranges in the register A10 the maximum length of visual display ('10' in hexadecimal). The block 554 (microinstructions SDIA, CRTB and MAD) exchanges the contents of the switching elements with the byte CL-400, zeroizes the register B09 and transfers the byte CP-313 to the register A02. The logical decision 555 examines the state of the switching element D103 which, if at "0", indicates that the change-over switch PLS is allocating the keyboard, console and display to program X and, conversely, to program Y (indicated by PART. 2 in Table M). If D103=1, a jump is executed to the address IDISA2 (block 560), otherwise (block 556 and microinstruction SDIA) the contents of the switching elements (which correspond to the byte CL-400) are exchanged with the register A08 (which corresponds to the byte BS-410). There is then examined the bit 05 of the byte BS-410 which is compiled by the instructions for introduction from the keyboard each time one of them is initiated. If this bit is at zero (no introduction reserved), operation passes onto blocks 558 and 559. The microinstructions CRTA and CRTB load the address $\phi\phi$E6 corresponding to the register P1-452 (FIG. 22) into the long register L09. The block 559 is also reached if process Y is active. In fact, in this case, blocks 560, 561 and 562 which are entirely similar to the blocks 556, 557 and 558 are executed. In this case, the address is different, since the address $\phi\phi$E9 which corresponds to the register P2-453 is recorded in the register L09. The following routines hereinbefore described are then carried out:

- Alphanumeric data sending routine
- Blank (space characters) sending routing
- Logical console lamps updating routine.

It is to be noted that the instruction DYM (FIG. 20 and Table 1) is executed only when it is encountered in the program. All the succeeding updatings required by the display are effected on the request of the hardware of the display through the medium of the microinstruction FIC40, which gives rise to the operations described heretofore. The field of the instruction DYM is visually displayed until some conditions change. One of these expressed by the logical decisions 557 and 561.

b. A keyboard instruction is in process of execution.

If an introduction has been reserved, a jump is made to one of the blocks 563 and 568 (for process X and process Y, respectively), starting from which consistency is verified by means of the logical decisions 564 and 569 between the position of the change-over switch PLS (bit 03 of CL-400) and the program being executed (bit 02 of CP-313). If there is no consistency, a jump is made to the block 570 where "11111111" will be recorded in the register A02 to indicate that inconsistency exists. There is moreover compiled in the long register L08 the absolute address of the field to be visually displayed recorded in P1-454 of ASPI, while the length of the field to be visually displayed is compiled in the register A14.

These parameters, length and address of the field, have been previously compiled in the register P1-450 or P1-454 by the last instruction Y0P or 0PC in progress.

Operation then goes on to the block 571, where a check is made as to whether characters have been introduced from the keyboard. If no character has been introduced, a jump is made to the block 572. This block is reached even if, following upon the check made as to consistency (logical decision 564 or 569), the condition of consistency has been verified between the position of PLS and the active process. In this case, the operations indicated by the block 565 are executed. The operations executed by this block are similar to those of the block 570, with the difference that the pointer addressed is P1-450 instead of P1-454, since in this case consistency between CP-313 and PLS is verified. Moreover, the register A02 is zeroized to indicate the condition of consistency. It is to be noted that at the end of the blocks 565 and 570 the register L09 is positioned at the address $\phi\phi$93 of the ZRM or at the address $\phi\phi\phi$3 of ASPI, respectively, inasmuch as these blocks comprise the microinstructions MAIP, MBIP and MAIP which increment the contents of the register L09 by one unit.

b1) Characters have been introduced and consistency is verified between CP and PLS (line 1 of Table H).

The block 566 begins at the address IDIST2 of Table M. This block, together with the logical decision 567, executes a check on the number of characters introduced. In the event of characters having been introduced, the block 573 extracts the byte V0-518 at the address $\phi\phi$CC of the ZRM and a check is made by means of the block 574 as to whether provision is made for visual display. If the current instruction for introduction provides for visual display, during the actual phase ALFA it sees to the zeroizing of the bit 07 of V0-518. If this bit is at zero, operation passes on to the blocks 575, 576 and 577, where the bits 00 and 02 of the byte AS-620 recorded at the address $\phi\phi$E$\phi$ are examined. This byte is compiled during phase ALFA of the introduction instructions. The bits 00 and 02, if at one, indicate respectively that the introduction is alphanumeric and with printing. If the instruction is numeric, operation passes on to the routine ID1STN, which attends to the unpacking of the data contained in a special accumulator register in which the numeric data is recorded in unpacked fashion. The data is sent to the display controller for visual display and then a jump is made to the address IDISP6 for lighting-up of the lamps. If, on the other hand, the introduction is alphanumeric and without printing, operation passes from the logical decision 577 to the block 578 (address IDIS40). This block calculates the number of spaces with respect to the number of characters introduced in a similar manner to what has been seen in the case of the block 540. Then, reentry at the address IDISPF is prearranged and a jump is executed to the address IDISP4. The corresponding routine attends to the sending of the space characters to the display as described hereinbefore. At the end, reentry is executed at the address IDISPF (block 579), which prearranges the following reentry at the address IDISP6, and a jump is made to the address IDISPC (block 542) at which visual display of the characters introduced is carried out. It is to be noted that in this case the addressing register L08 contains the visual display address II recorded in the pointer P1-450, while in the case of the instruction DYM it contains the address II recorded in P1-452. Reentry at the address IDISP6 is then executed for lighting-up of the console lamps.

b2) Characters have been introduced and consistency between CP and PLS is not verified In this case, operation passes from the logical decisions 564 and 569 to the block 570 (address IDISTB) where, as has been seen, there is compiled in L08 the address II and in A14 the length LL, read from the register P1-454 of ASPI. This register content is compiled by taking the contents of P1-450 of the ZRM when the current program is interrupted because of biprogramming (as explained hereinbefore). It is to be noted that the register L09 contains the address of the cell $\phi\phi\phi3$ of ASPI. A check is then made on the number of characters introduced (blocks 571 and 579). If characters have been introduced, there is forced into B10 the number 39, which corresponds to the displacement of the byte V0-518 with respect to the contents of the register L09 (block 580). Reentry at the address IBIPRM is then prearranged (block 581) and a jump is executed to the address IBIPRN (block 582). In this block there is calculated the absolute address of the byte V0-518 relating to the program in ASPI. This address is obtained by adding the constant 39 to the addresser L09 and is recorded in L10 without altering the contents of L09. Reentry at IBIPRM is then executed, at which address the blocks 583 and 584 are executed to check whether visual display is provided, similarly to the blocks 573 and 574. If visual display is not provided, a jump is made to IDIST1 (block 572). Otherwise, blocks 585, 586 and 587, which are similar to blocks 575, 576 and 577, are executed. That is to say, the bits 00 and 02 of the byte AS-320 are analyzed. Even in this case, if the introduction is alphanumeric and without printing, a jump is made to the address IDIST40 (block 578) at which begins the visual display of the characters introduced, which, as has been seen, are extracted by using the address contained in P1-454 of ASPI. In the case of numeric introduction, a jump is executed from the logical decision 586 to the block 597, starting from which the routine of calculation of the address of the accumulator register in ASPI is executed (blocks 592 and 582). Then, prearrangement for visual display of the field introduced is executed (block 598) and, finally, a jump is executed to the address IDISTN, starting from which the characters are visually displayed as previously. Finally, there follows the routine of updating of the lamp information, which concludes the microinterrupt.

b3) No character introduced and YOP or OPC is not in progress (third line of Table H)

In this case, a jump is made from the logical decisions 567 and 579 to the address IDIST1 (block 572). The block 572 is also arrived at in the case of introduction without display (logical decision 574) or of an introduction with printing (logical decision 577). Therefore, the block 572 is arrived at in the event of the instruction for introduction not requiring that the characters introduced be visually displayed, or because characters have not yet been introduced, or, finally, because the instruction requires printing of the data introduced. The block 572 checks whether there is consistency between the program being executed (CP-313) and PLS, using the register A02 which has been previously compiled by the block 565 or the block 570.

If consistency is verified, operation proceeds with the block 589, otherwise a jump is executed to the block 590, starting from which there is extracted the byte equivalent to the byte DE-460 resident in ASPI. After this, a return is made to IDISTE (block 591). In each case, the byte DE-460 is put into the switching elements and, by examining the bits 07 and 04, respectively, a check is made whether an instruction OPC (operator call) or an instruction YOP (introduce and display visually for debugging) is in progress. If the instruction in progress is not an instruction YOP or an instruction OPC, the block 595 (address IDIS42) is executed, which tests the position of the change-over switch PLS, taking it directly from the console by means of a microinstruction TCCA.

If the change-over switch PLS is positioned at program X (indicated by division 1 in the logical decision 596), a jump is made to the block 558, starting from which the field of the last instruction DYM executed by program X is visually displayed. Conversely, a jump is made to the block 562 and the instruction DYM relating to program Y is visually displayed. In both cases, the blocks 558 and 559 or 562 and 559 compile the register L09 with the address $\phi\phi E6$ or $\phi\phi E9$ (FIG. 22) according to whether the instruction DYM belongs to program X or to program Y.

b4) No character introduced and an instruction YOP or OPC is in progress (fifth and sixth lines of Table H).

If, from a check of the byte DE-420, it is found that the instruction in progress is an instruction OPC or an instruction YOP (logical decisions 593, 594), a jump is executed to the address IDSZZ (block 540), as a result of which the service message of the instruction OPC or YOP in progress is visually displayed.

In fact, as has been said in Section b3, in the register L09 there is recorded either the address $\phi\phi93$ or the address $\phi\phi\phi3$ of ASPI, respectively, depending on whether there is consistency or no consistency between the program in progress and the position of the change-over switch PLS. Starting from IDSZZ, the register L09 is used to load the register L08 with the address H taken from P2-451 or from P2-455, while in the register B11 there is recorded the length of the zone to be visually displayed. Finally, the visual display is effected by the sequence of the routine of visual display of alphanumeric data, the blank sending routine and the lamp lighting routine, as stated hereinbefore.

CONCLUDING REMARKS

From what has been said it will be clear how the display according to the invention enables various types of messages to be visually displayed in dependence upon the machine state.

More particularly, if no introduction of data from the keyboard which provides for visual display is in progress, the normal operator guidance message is visually displayed. This message specifies the nature and the number of data required by the program and is supplied by the last instruction DYM executed by the program selected by the change-over switch PLS.

This message persists on the display until such time as the operator initiates the introduction of the data in response thereto. During the stage of introduction of data, the data is visually displayed in a dynamic manner, that is each new character is inserted to the right of those which precede it in the display.

If the program not selected by the change-over switch PLS requires an extraordinary intervention by the operator (to remove a cause that is not handled), it calls an instruction 0PC which produces the lighting-up of the lamp PLA and the sound of a buzzer. The operator concludes the introduction and the message relating to the last instruction DYM handled appears on the display.

When the operator changes the change-over switch PLS over, the message indicated by the preceding instruction 0PC, which requests the introduction of data from the keyboard, appears on the display.

When the operator introduces this data, the data introduced appears in place of the message of the instruction 0PC on the display. The operator then repositions the change-over switch PLS at the preceding program and the message of the following instruction DYM is visually displayed on the display. In this way, the operator is always guided by the display: in fact, he is warned by an explicit message of possible abnormalities which may occur in one of the two programs and the characters introduced are moreover visually displayed if required.

Variations or additions of parts may be made in the display which has just been described without departing from the scope of the invention.

TABLE H

| INTRODUCTION RESERVED? b02 of BS-h10(x) b03 of BS-h10(y) | HAVE CHARACTERS BEEN INTRODUCED? b05 of BS-h10 | IS THERE CONSISTENCY BETWEEN CP AND PLS? b03 of C2-h00 | IS A YOP OR OPC INSTRUCTION IN PROGRESS? | MESSAGE VISUALLY DISPLAYED BY THE DISPLAY |
|---|---|---|---|---|
| YES | YES | YES | IMMATERIAL | CRT INTRODUCED ACCORDING TO ZRM |
| YES | YES | NO | IMMATERIAL | CRT INTRODUCED ACCORDING TO ASPI |
| YES | NO | IMMATERIAL | NO | FIELD INDICATED BY THE INSTRUCTION "DYM" |
| NO | IMMATERIAL | IMMATERIAL | IMMATERIAL | |
| YES | NO | NO | YES | SERVICE MESSAGE ACCORDING TO ASPI |
| YES | NO | YES | YES | SERVICE MESSAGE ACCORDING TO ZRM |

TABLE L

| SYMBOLIC NAME | FUNCTION CODE | OPERANDS | | HEXADECIMAL INSTRUCTION |
|---|---|---|---|---|
| IDIS10 | CRTA | A02 | CFO | 8 2 F 0 |
| | AND | A02 | B15 | 6 2 F 0 |
| | SADI | D01 | IDIS11 | 3 1 F 6 |
| | CRTB | B15 | COF | 9 F O F |
| IDIS11 | MAD | A02 | CB6 | 0 2 3 6 |
| | SADI | A02 | | 3 2 E 7 |
| | CRTB | B10 | CE9 | 9 A E 9 |
| | SADI | D02 | IDIS1D | 3 2 F B |
| | CRTB | B10 | CE6 | 9 A E 6 |
| IDIS1D | CRTB | B02 | C06 | 9 2 0 6 |
| | COM1 | | | 3 1 7 3 |
| IDIS13 | TBA | A14 | B10 | 5 E A 3 |
| | BMIP | A14 | B15 | E E F 1 |
| | BMIP | A14 | B08 | E E 8 1 |
| | AMIP | A14 | A08 | E E 8 9 |
| | SAI | IDISZZ | | 0 C F C |

TABLE M

| SYMBOLIC NAME | FUNCTION CODE | OPERANDS | | HEXADECIMAL INSTRUCTION |
|---|---|---|---|---|
| IDISO | TCCA | A08 | | A 8 8 8 |
| | MAD | A10 | CDE | 0 A 0 E |
| | TADI | A10 | | 3 A E 7 |
| | CRTA | A10 | C10 | 8 A 1 0 |
| | SDIA | A08 | | 3 8 8 7 |
| | CRTB | B09 | C00 | 9 9 0 0 |
| | MAD | A02 | CB6 | 0 2 3 6 |
| | SADI | D03 | IDISA2 | 3 3 5 9 |

TABLE M-continued

| SYMBOLIC NAME | FUNCTION CODE | OPERANDS | | HEXADECIMAL INSTRUCTION |
|---|---|---|---|---|
| | SDIA | A08 | | 3 8 8 7 |
| | SADI | D05 | IDISTO | 3 5 B 7 |
| IDISZA | CRTA | A09 | CE6 | 3 9 E 6 |
| IDISZB | CRTB | B09 | C00 | 9 9 0 0 |
| IDISZZ | MBIP | M09 | B11 | E 9 B 5 |
| | SEDI | D00 | | 3 8 6 6 |
| | SOTA | A10 | B11 | 6 A B A |
| | MBIP | M09 | B08 | E 9 8 5 |
| | MAI | M09 | A08 | E 9 8 F |
| | ICB | B11 | | A B 4 4 |
| | CRTB | B02 | IDISPH | 9 2 4 0 |
| IDISPC | MAIP | M08 | A02 | E 8 2 D |
| | DCB | B11 | | A B 5 7 |
| | TABC | A02 | B02 | 5 2 2 0 |
| | COM14 | | | 3 E 7 3 |
| | SADO | D01 | IDISPC | 2 1 3 A |
| | SAI | IDISPD | | 1 0 4 8 |
| IDISPH | CRTB | B02 | IDISP6 | 9 2 8 F |
| IDISP4 | CRTA | A14 | C20 | 3 E 2 0 |
| | DCA | A10 | | A A 4 A |
| | SADI | D01 | IDISPD | 3 1 4 8 |
| IDISP8 | DCA | A10 | | A A 4 A |
| | TABC | A14 | B11 | 5 E B 0 |
| | COM14 | | | 3 E 7 3 |
| | SADO | D01 | IDISP8 | 2 1 4 4 |
| IDISPD | TBA | A01 | B02 | 5 1 2 3 |
| IDISA2 | SDIA | A08 | | 3 8 8 7 |
| | SADI | D04 | IDIST9 | 3 4 0 D |
| IDISZ0 | CRTA | A09 | CE9 | B 9 E 9 |
| | SAI | IDISZB | | 1 0 3 2 |
| IDISP6 | MAD | A02 | CEF | 0 2 E F |
| | MAD | A10 | CEE | 0 A E E |
| | TAB | A10 | B02 | 5 A 2 C |
| | TCCA | A11 | | A B B 8 |
| | TADI | A11 | | B B E 7 |
| | SADI | D03 | IDISP5 | 3 3 3 4 |
| | CRTB | B11 | C7F | 9 B 7 F |
| IDISP7 | AZBM | B02 | | 3 2 5 7 |
| | ORA | A02 | B02 | 6 2 2 E |
| IDISP0 | TABC | A02 | B02 | 5 2 2 0 |
| | COM14 | | | 3 E 7 3 |
| | SAI | IALFA | | 0 2 0 0 |
| IDISP5 | ROTB | B02 | | 3 2 1 6 |
| | CRTB | B11 | CF7 | 9 B F 7 |
| | SAI | IDISP7 | | 1 0 9 6 |
| IDISTO | TADI | A02 | | 8 2 E 7 |
| | SADI | D02 | IDIST6 | 3 2 C F |
| IDIST7 | CRTA | A09 | C90 | 8 9 9 0 |
| | MAIP | M09 | A14 | E 9 E D |
| | MBIP | M09 | B08 | E 9 8 5 |
| | MAIP | M09 | A08 | E 9 8 D |
| | CRTA | A02 | C00 | 8 2 0 0 |
| IDIST2 | CRTB | B11 | C1F | 9 B 1 F |
| | ANDA | A14 | B11 | 6 E B 8 |
| | SADI | D01 | IDIST1 | 3 1 0 0 |
| | MAD | A10 | CCC | C A C C |
| | TADI | A10 | | 3 A E 7 |
| | SADI | D07 | IDIST1 | 3 7 0 0 |
| | MAD | A10 | CE0 | C A E 0 |
| | TADI | A10 | | 3 A E 7 |
| | TAB | A14 | B11 | 5 E B C |
| | SADO | D00 | IDISTN | 2 0 5 D |
| | SADI | D02 | IDIST1 | 3 2 D 0 |
| IDIS40 | CRTA | A10 | C11 | 8 A 1 1 |
| | SOTA | A10 | B11 | 6 A B A |
| | CRTB | DB2 | IDISPF | 9 2 E 7 |
| | SAI | IDISP4 | | 1 0 4 1 |
| IDIST9 | TADI | A02 | | 3 2 E 7 |
| | SADI | D02 | IDIST7 | 3 2 3 9 |
| IDIST6 | SAI | IDISTB | | 1 D 7 D |
| IDIST1 | VRA | A02 | | A 2 4 B |
| | SADO | D01 | IDISTD | 2 1 D B |
| | MAD | A10 | CE3 | 0 A E 3 |
| IDISTE | TADI | A10 | | 3 A E 7 |
| | CRTA | A10 | C10 | 8 A 1 0 |
| | SADI | D07 | IDISZZ | 3 7 3 3 |
| | SADI | D04 | IDISZZ | 3 4 3 3 |
| IDIS42 | TCCA | A02 | | A 2 B 8 |
| | TADI | A02 | | 3 2 E 7 |
| | SADO | D03 | IDISZA | 2 3 3 1 |
| | SAI | IDISZC | | 1 0 5 B |
| IDISPF | CRTB | B02 | IDISP6 | 9 2 8 F |
| | SAI | IDISPC | | 1 0 3 A |
| IDISTB | CRTA | A02 | CFF | 8 2 F F |
| | MAD | A09 | CC0 | C 9 C 0 |
| | TAB | A09 | B09 | 5 9 9 C |
| | MAD | A09 | CC1 | C 9 0 1 |
| | MAIP | M09 | A14 | E 9 E D |
| | MBIP | M09 | B08 | E 9 8 5 |
| | MAIP | M09 | A08 | E 9 8 D |
| | SAI | IBIPRJ | | 1 D B 9 |
| IBIPRW | CRTB | B10 | C29 | 9 A 2 9 |

TABLE M-continued

| SYMBOLIC NAME | FUNCTION CODE | OPERANDS | | HEXADECIMAL INSTRUCTION |
|---|---|---|---|---|
| IBIPRN | REDI | D00 | | 3 0 6 6 |
| | CRTA | A10 | C00 | 8 A 0 0 |
| | ADDB | A09 | B10 | 6 9 A 5 |
| | ADDA | A10 | B09 | 6 A 9 9 |
| | SAB | A10 | B10 | 5 A A F |
| | MAI | M10 | A10 | E A A F |
| | TBA | A01 | B02 | 5 1 2 3 |
| IBIPRQ | TAB | A10 | B10 | 5 A A C |
| | TBA | A02 | B10 | 5 2 A 3 |
| | SEDI | D00 | | 3 8 6 6 |
| | CRTA | A10 | C10 | 8 A 1 0 |
| | SOTA | A10 | B11 | 5 A B A |
| | SAI | IDIS43 | | 1 0 6 1 |
| IBIPRP | SAI | IDIS42 | | 1 0 D 7 |
| IBIPRO | CRTB | B02 | IBIPRQ | 9 2 A A |
| | SAI | IBIPRW | | 1 D 8 5 |
| IDISTD | CRTB | B02 | IDISTE | 9 0 D 3 |
| | SAI | IBIPRW | | 1 D 8 5 |
| IBIPRJ | CRTB | B11 | CIF | 9 B 1 F |
| | ANDA | A14 | B11 | 6 E B 8 |
| | SADI | D01 | IBIPRL | 3 1 C 7 |
| | CRTB | B10 | C39 | 9 A 3 9 |
| | CRTB | B02 | IBIPRM | 9 2 3 F |
| | SAI | IBIPRN | | 1 D 8 6 |
| IBIPRM | TADI | A10 | | 3 A E 7 |
| | SADI | D07 | IBIPPL | 3 7 0 7 |
| | MAD | A10 | CEO | C A E 0 |
| | TADI | A10 | | 8 A E 7 |
| | TAB | A14 | B11 | 5 E B C |
| | SADO | D00 | IBIPRO | 2 0 3 1 |
| | SADI | D02 | IBIPRP | 3 2 B 0 |
| | SAI | IDIS40 | | 1 0 0 9 |
| IBIPRL | SAI | IDIST1 | | 1 0 D 0 |

What we claim is:

1. Display apparatus for an accounting computer comprising:
   a keyboard for introducing data and instructions into said computer,
   a service console,
   a memory including a first and a second zone each for storing data and instructions associated with a first and a second program respectively,
   a processing unit,
   a visual display,
   an addressing register included in said processing unit for addressing said memory,
   a control unit for said visual display controlled by said processing unit for supplying the data to be displayed to said visual display,
   means for identifying a plurality of fields of said memory containing data to be visually displayed, one of said fields storing the characters introduced from said keyboard including
   first identifying means associated with said first program and
   second identifying means associated with said second program,
   means for recording a plurality of conditions represented by first signals associated with said keyboard, a second signal associated with said console and third signals associated with said processing unit,
   control means for executing the instructions associated with said first and said second program,
   means included in said console and manually operable for associating said visual display with said first and said second program,
   said means for recording the said condition representing signals comprising
   a first element for defining which of said first and second programs is being executed,
   a second element controlled by said associating means for defining with which of said first and second programs said visual display is associated and
   means controlled by said first and said second elements for selectively transferring to said addressing register an address of a field to be displayed of said plurality of fields which is associated with said first or said second identifying means,
   means for testing the conditions stored in said recording means, and
   means controlled by said means for testing for conditioning said processing unit to transfer selectively to said addressing register from said identifying means the address of the field of said plurality of fields to be displayed on said visual display which is associated with said conditions as established by said means for recording, whereby said control unit displays on said visual display the memory field addressed by said addressing register.

2. A display apparatus as in claim 1, wherein said identifying means comprise
   a plurality of descriptive registers including
   a first descriptive register for recording a length and the address of the field to be displayed by a first type of said instructions for displaying on said visual display introduction guidance messages to an operator,
   a second descriptive register for recording a length and the address of the field to be displayed by a second type of said instructions for displaying on said visual display the data introduced from said keyboard, and
   a third descriptive register for recording a length and the address of the field to be displayed by a third type of said instructions for displaying on said visual display service messages associated with said abnormal conditions in the operation of said computer, said first signals comprising a first and a second kind of signals, and wherein said means for recording said plurality of conditions comprise:
- a first register controlled by the instructions of said second type for recording said first kind of said first signals associated with said keyboard condition of reserved introduction or said second kind of said first signals associated with the keyboard condition of started introduction, and
- a second register controlled by the instructions of said third type for recording one of said third signals associated with the condition of execution in progress of another one of said instructions.

3. Display apparatus as in claim 2, wherein the content of said descriptive registers are recorded in said first zone of said memory during the execution of said first program and in said second zone during the execution of said second program and further comprising
- third means included in said processing unit and controlled by said first and second elements for transferring the address and the length of the field of the memory to be displayed on said visual display to said addressing register from said second or third descriptive register as recorded in said first zone when the program being executed corresponds to the program associated with said visual display, and from said second or said third descriptive register as stored in said second zone, respectively, when the program being executed does not correspond to the program associated with said visual display.

4. A display apparatus as in claim 3, wherein the instructions of the first type belonging to the said first program are associated with said first descriptive register and the instructions of first type belonging to said second program are associated with a fourth descriptive register included in said plurality of descriptive registers, and further comprising:
- fourth means included in said processing unit and controlled by said second element for selectively transferring the address and the length of the field to be displayed to said addressing register from said first descriptive register when said visual display is associated with said first program and from said fourth descriptive register when said visual display is associated with said second program.

5. A display apparatus as in claim 1, wherein said first and second identifying means comprise
- a plurality of descriptive registers each of said registers recording a length and the address of one of the fields to be displayed, said processing unit responding to display instructions of the instructions in said memory for recording said length and said address in said descriptive registers, each of said display instructions being associated with at least one of said descriptive registers.

6. A display apparatus as in claim 5, wherein said plurality of descriptive registers comprises a first descriptive register for recording the length and the address of the field to be displayed by a first type of said display instructions for displaying on said visual display introduction guidance messages to an operator,
- a second descriptive register for recording the length and the address of the field to be displayed by a second type of said display instructions for displaying on said visual display the data introduced from said keyboard,
- and a third descriptive register for recording the length and the address of the field to be displayed by a third type of said display instructions for displaying on said visual display the service messages associated with abnormal conditions in the operation of the said computer, and wherein said means for recording said plurality of conditions comprise:
- a first register controlled by said second type of said display instructions for recording a first signal associated with a condition of reserved introduction of data from said keyboard and a second signal associated with a condition of started introduction, and
- a second register controlled by said third type of said display instructions for recording a third signal associated with the conditions of execution in progress of said third type of said display instruction.

7. A display apparatus as in claim 6, wherein said means controlled by said testing means comprises:
- first means responsive to both the absence or presence of said first signal and the simultaneous absence of said second signal and said third signal for transferring the address and the length of the field to be displayed on said visual display which are associated with said first type of display instructions to said addressing register from said first descriptive register.

8. A display apparatus as in claim 7, wherein said means controlled by said testing means further comprises:
- second means responsive to the simultaneous presence of said first signal and said second signal for transferring the address and the length of the field to be displayed on said visual display which are associated with the instruction of said second type to said addressing register from said second descriptive register.

9. Display apparatus as in claim 8, wherein said means controlled by said testing means further comprises:
- third means responsive to the simultaneous presence of said first and said third signal and by the absence of said second signal for transferring the address and the length of the field to be visually displayed on said visual display which are associated with the instruction of said third type from said third descriptive register to said addressing register.

* * * * *

UNITED STATES PATENT AND TRADEMARK OFFICE
CERTIFICATE OF CORRECTION

PATENT NO. : 4,079,449
DATED : March 14, 1978
INVENTOR(S) : Luigi Mercurio, Piercarlo Ravasio It is certified that error appears in the above-identified patent and that said Letters Patent are hereby corrected as shown below:

Change inventor's name "Ravasto" to -- RAVASIO --.

Signed and Sealed this

First Day of August 1978

[SEAL]

Attest:

RUTH C. MASON
*Attesting Officer*

DONALD W. BANNER
*Commissioner of Patents and Trademarks*